(12) United States Patent
Yamamura

(10) Patent No.: US 7,885,006 B2
(45) Date of Patent: Feb. 8, 2011

(54) LENS UNIT, LIGHT EMITTING DIODE HEAD, EXPOSURE DEVICE, IMAGE FORMING APPARATUS, AND READING APPARATUS

(75) Inventor: Akihiro Yamamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 12/707,749

(22) Filed: Feb. 18, 2010

(65) Prior Publication Data

US 2010/0220375 A1    Sep. 2, 2010

(30) Foreign Application Priority Data

Feb. 27, 2009   (JP) .............................. 2009-047159

(51) Int. Cl.
    *G02B 27/10* (2006.01)
(52) U.S. Cl. ................... 359/619; 359/621; 359/622
(58) Field of Classification Search ............. 359/619, 359/621, 622, 626, 642, 796, 455
    See application file for complete search history.

(56) References Cited

U.S. PATENT DOCUMENTS

2001/0028506 A1 * 10/2001 Fujimoto et al. ............ 359/622

FOREIGN PATENT DOCUMENTS

JP       2008-087185 A    4/2008

\* cited by examiner

*Primary Examiner*—Jack Dinh
(74) *Attorney, Agent, or Firm*—Kubotera & Associates LLC

(57) ABSTRACT

A lens unit includes a lens array, a first light blocking member, and a second light blocking member. The lens array includes a plurality of lens pairs arranged in a substantially linear arrangement. Each of the lens pairs includes a first lens for forming an inverted reduced-size image of an object and a second lens for forming an inverted enlarged-size image of the inverted reduced-size image. The first light blocking member is disposed between the first lenses and the second lenses, and includes first apertures. The second light blocking member includes second apertures arranged in a substantially linear arrangement corresponding to an arrangement interval of the lens pairs, and having different opening portion shapes depending on a position of the lens pairs in an optical axis direction of the lens pairs. The second light blocking member is disposed at least between the first lenses and an object plane or the second lenses and an image plane.

20 Claims, 14 Drawing Sheets

LENS UNIT, LIGHT EMITTING DIODE HEAD, EXPOSURE DEVICE, IMAGE FORMING APPARATUS, AND READING APPARATUS

BACKGROUND OF THE INVENTION AND RELATED ART STATEMENT

The present invention relates to a lens unit; a light emitting diode (LED) head including the lens unit; an exposure device including the lens unit; an image forming apparatus including the exposure device; and a reading apparatus including the lens unit.

A conventional lens unit is used as an optical system capable of forming an erected same-size image of an object in a line, and is arranged arrangement in an image forming apparatus of an electro-photography type or a reading apparatus such as a scanner and a facsimile. The image forming apparatus uses an LED (Light Emitting Diode) head in which a plurality of LEDs is arranged in a linear arrangement. In the reading apparatus, an image of an original is formed on a light receiving unit formed of a plurality of light receiving elements arranged linearly.

The conventional lens unit as an optical system includes a lens pair formed of a lens for forming an inverted reduced-size image of an object and a lens for forming an inverted enlarged-size image of an object. A plurality of the lens pairs is arranged substantially linearly, so that the erected same-size image of an object is formed in a linear arrangement. (refer to Patent Reference).

Patent Reference: Japanese Patent Publication No. 2008-87185

In the conventional lens unit, a plurality of the lens pairs is arranged substantially linearly. Accordingly, when light leaking from one of two lenses arranged next to with each other is incident on the other of the two lenses, the image forming apparatus forms an image with low contrast, thereby deteriorating a resolution of a projected image formed with the lens unit.

In view of the problems described above, an object of the present invention is to provide a lens unit capable of solving the problems of the conventional lens unit and forming an image with a high resolution.

Further objects and advantages of the invention will be apparent from the following description of the invention.

SUMMARY OF THE INVENTION

In order to attain the objects described above, according to the present invention, a lens unit includes a lens array, a first light blocking member, and a second light blocking member. The lens array includes a plurality of lens pairs arranged in a substantially linear arrangement. Each of the lens pairs includes a first lens for forming an inverted reduced-size image of an object and a second lens for forming an inverted enlarged-size image of the inverted reduced-size image formed with the first lens. The first light blocking member is disposed between the first lenses and the second lenses, and includes first apertures. The second light blocking member includes second apertures arranged in a substantially linear arrangement corresponding to an arrangement interval of the lens pairs, and having different opening portion shapes depending on a position of the lens pairs in an optical axis direction of the lens pairs. The second light blocking member is disposed at least between the first lenses and an object plane or the second lenses and an image plane.

As described above, in the present invention, the lens unit is capable of forming an image with a high resolution.

BRIEF DESCRIPTION OF THE DRAWINGS

FIGS. 6(a) and 6(b) are schematic views showing a mask as a second light blocking member of the printer according to the first embodiment of the present invention, wherein FIG. 6(a) is a schematic plan view of the mask, and FIG. 6(b) is a schematic plan view showing an aperture thereof;

FIGS. 7(a) and 7(b) are schematic plan views showing a lens array of the lens unit according to the first embodiment of the present invention, wherein FIG. 7(a) is a schematic plan view of the lens array, and FIG. 7(b) is a schematic plan view showing micro lenses thereof;

FIGS. 8(a) and 8(b) are schematic plan views showing a light blocking plate as a first light blocking member of the lens unit according to the first embodiment of the present invention, wherein FIG. 8(a) is a schematic plan view of the light blocking plate, and FIG. 8(b) is a schematic plan view showing intermediate apertures thereof;

FIGS. 12(a) and 12(b) are schematic views showing a focal length measurement device, wherein FIG. 12(a) is a schematic plan view thereof and FIG. 12(b) is a schematic side view thereof;

DETAILED DESCRIPTION OF PREFERRED EMBODIMENTS

Hereunder, preferred embodiments of a lens unit; a light emitting diode (LED) head including the lens unit; an exposure device including the lens unit; an image forming apparatus including the exposure device; and a reading apparatus including the lens unit according to the present invention will be explained with reference to the accompanying drawings.

First Embodiment

Figure 2:
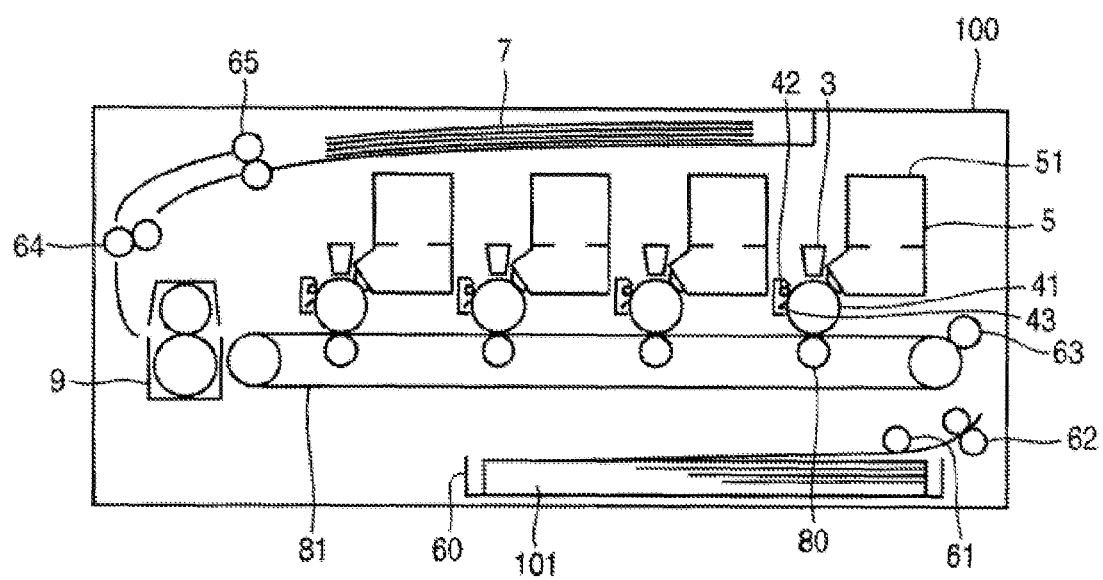
FIG. 2 is a schematic sectional view showing the printer according to the first embodiment of the present invention.

A first embodiment of the present invention will be explained. A printer 100 will be explained as an image forming apparatus with reference to FIG. 2. FIG. 2 is a schematic sectional view showing the printer 100 according to the first embodiment of the present invention. In the embodiment, the printer 100 forms an image on a printing medium according to image data using toner formed of a resin containing a colorant as a color agent.

As shown in FIG. 2, a sheet supply cassette 60 is disposed in the printer 100 for storing a sheet 101 as the printing medium. A sheet supply roller 61 is provided for picking up the sheet 101 from the sheet supply cassette 60, and transport rollers 62 and 63 are provided for transporting the sheet 101 picked up from the sheet supply cassette 60.

In the embodiment, the printer 100 is a color printer of an electro-photography type. The printer 100 includes an image forming portion for forming images in colors of yellow, magenta, cyan, and black. The image forming portion is formed of photosensitive drums 41 as a static latent image supporting member; developing devices 5 for developing static latent images formed on the photosensitive drums 41 to form toner images; and toner cartridges 51 for supplying toner to the developing devices 50. The photosensitive drums 41, the developing devices 5, and the toner cartridges 51 are arranged along a transportation path of the sheet 101.

In the embodiment, charging rollers 42 and LED (Light Emitting Diode) heads 3 as optical heads are arranged to face surfaces of the photosensitive drums 41. The charging rollers 42 are provided for charging the surfaces of the photosensitive drums 41. The LED heads 3 are provided for selectively irradiating the surfaces of the photosensitive drums 41 according to the image data to form the static latent images thereon.

In the embodiment, transfer rollers 80 are disposed to face the photosensitive drums 41 with a transfer belt 81 in between. The transfer belt 81 is provided for transporting the sheet 10 at a transfer portion. The transfer rollers 80 are provided for transferring the toner images formed on the photosensitive drums 41 as images of the static latent images visualized with toner to the sheet 101. Cleaning blades 43 are arranged to contact with the surfaces of the photosensitive drums 41 for removing toner remaining on the surfaces of the photosensitive drums 41 after the sheet 101 passes through the transfer portion.

In the embodiment, a fixing device 9 is disposed on a downstream side of the transfer portion for fixing the toner images transferred to the sheet 101 through heat and pressure. A transport roller 64 is provided for transporting the sheet 101 after the sheet 101 passes through the fixing device 9. Further, a discharge roller 65 is provided for discharging the sheet 101 to a discharge portion 7 for storing the sheet 101 therein after the sheet 101 is transported with the transport roller 64.

In the embodiment, a power source (not shown) applies a specific voltage to the charging rollers 42 and the transfer rollers 80. A motor (not shown) and a drive transmission gear (not shown) drive the transfer belt 81, the photosensitive drums 41, and each roller to rotate. A power source (not shown) and a control unit (not shown) are connected to the developing devices 5, the LED heads 3, the fixing device 9, and each motor (not shown).

In the embodiment, the printer 100 further includes an external interface (not shown) for receiving the print data from a host device, so that an image is formed on the sheet 101 or the printing medium according to the print data received through the external interface. Further, the printer 100 includes a control unit (not shown) as a control device and a calculation device for storing a control program in a storage unit thereof such as a memory, and for controlling an entire operation of the printer 100 according to the control program.

Figure 3:
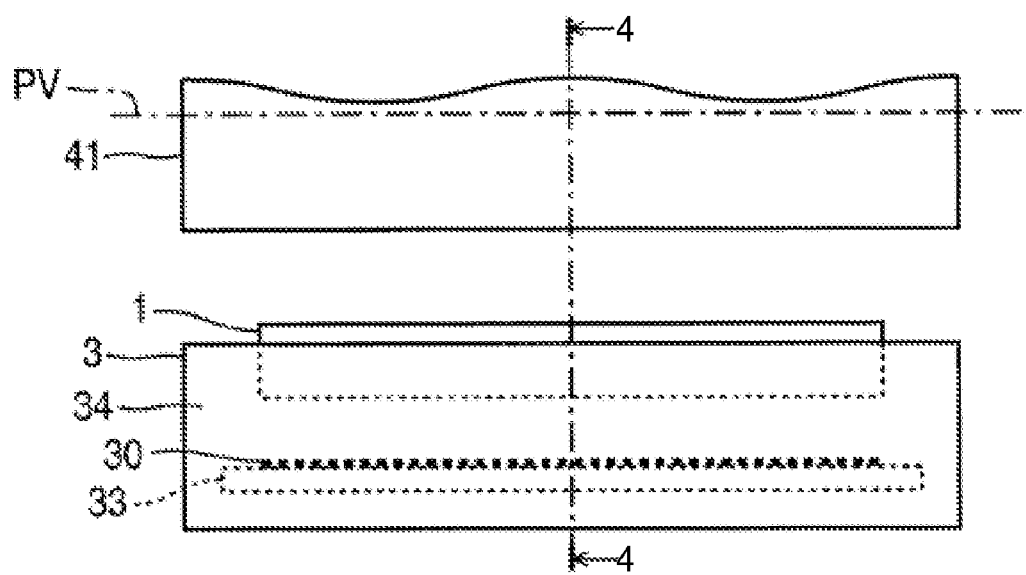
FIG. 3 is a schematic side view showing an LED (Light Emitting Diode) head of the printer according to the first embodiment of the present invention.

A configuration of the LED head 3 will be explained next with reference to FIG. 3. FIG. 3 is a schematic side view showing the LED head 3 of the printer 100 according to the first embodiment of the present invention.

As shown in FIG. 3, the LED head 3 is provided with a lens unit 1. The lens unit 1 is fixed to the LED head 3 with a holder 34. The LED head 3 further includes a plurality of LED elements 30 as light emitting portions arranged on a circuit board 33 in a substantially linear arrangement.

In the embodiment, the photosensitive drum 41, on which the static latent image is formed, is arranged such that a rotational axis of the photosensitive drum PV is aligned with a horizontal direction in FIG. 3. The lens unit 1 is formed in an elongated shape, and is arranged in parallel to the LED elements 30 arranged in the substantially linear arrangement. Further, the lens unit 1 is arranged in parallel to the rotational axis PV of the photosensitive drum 41. Further, the lens unit 1 includes micro lenses 12 (refer to FIG. 4) having optical axes extending in a vertical direction in FIG. 3.

Figure 4:
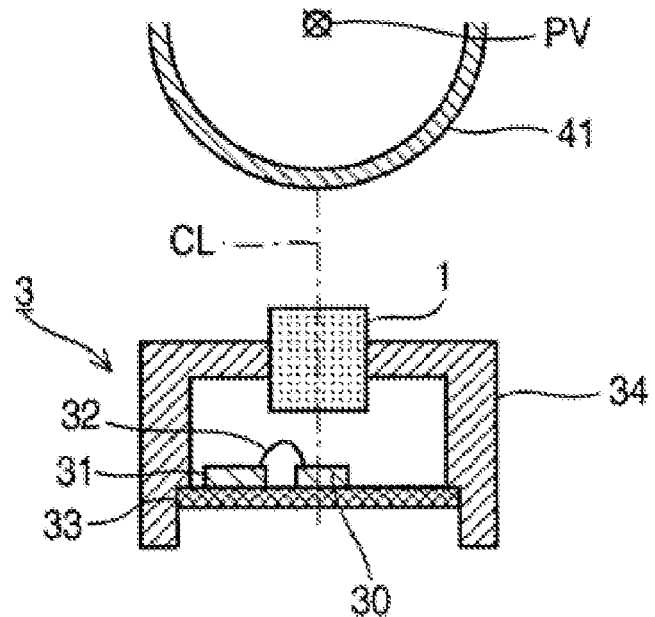
FIG. 4 is a schematic sectional view showing the LED head of the printer taken along a line 4-4 in FIG. 3 according to the first embodiment of the present invention.

FIG. 4 is a schematic sectional view showing the LED head 3 of the printer 100 taken along a line 4-4 in FIG. 3 according to the first embodiment of the present invention. As shown in FIG. 4, the lens unit 1 includes the micro lenses 12 having the optical axes extending in a vertical direction in FIG. 4 as well. The lens unit 1 is arranged such that a centerline CL thereof is aligned with a line between the LED elements 30 and the photosensitive drum 41. The LED elements 30 are arranged in an arrangement direction perpendicular to a sheet of the drawing, and the photosensitive drum 41 is arranged such that the rotational axis PV extends in a direction perpendicular to the sheet of the drawing.

In the embodiment, the LED elements 30 and driver ICs (Integrated Circuits) 31 are mounted on the circuit board 33. The LED elements 30 and the driver ICs 31 are connected through wiring portions 32, so that the driver ICs 31 control the LED elements 30 as the light emitting portions to emit light. The LED elements 30 are arranged linearly in one row with an interval PD (mm). With the lens unit 1, an image of the LED elements 30 is formed on the photosensitive drum 41. When the photosensitive drum 41 rotates and the LED elements 30 emit light, the static latent image is formed on the photosensitive drum 41.

In the embodiment, The LED head 3 has a resolution of 600 dpi (dot per inch), and 600 of the LED elements 31 are arranged in one inch (=about 25.4 mm). That is, the LED elements 31 are arranged with the interval PD of 0.0423 mm.

Figure 5:
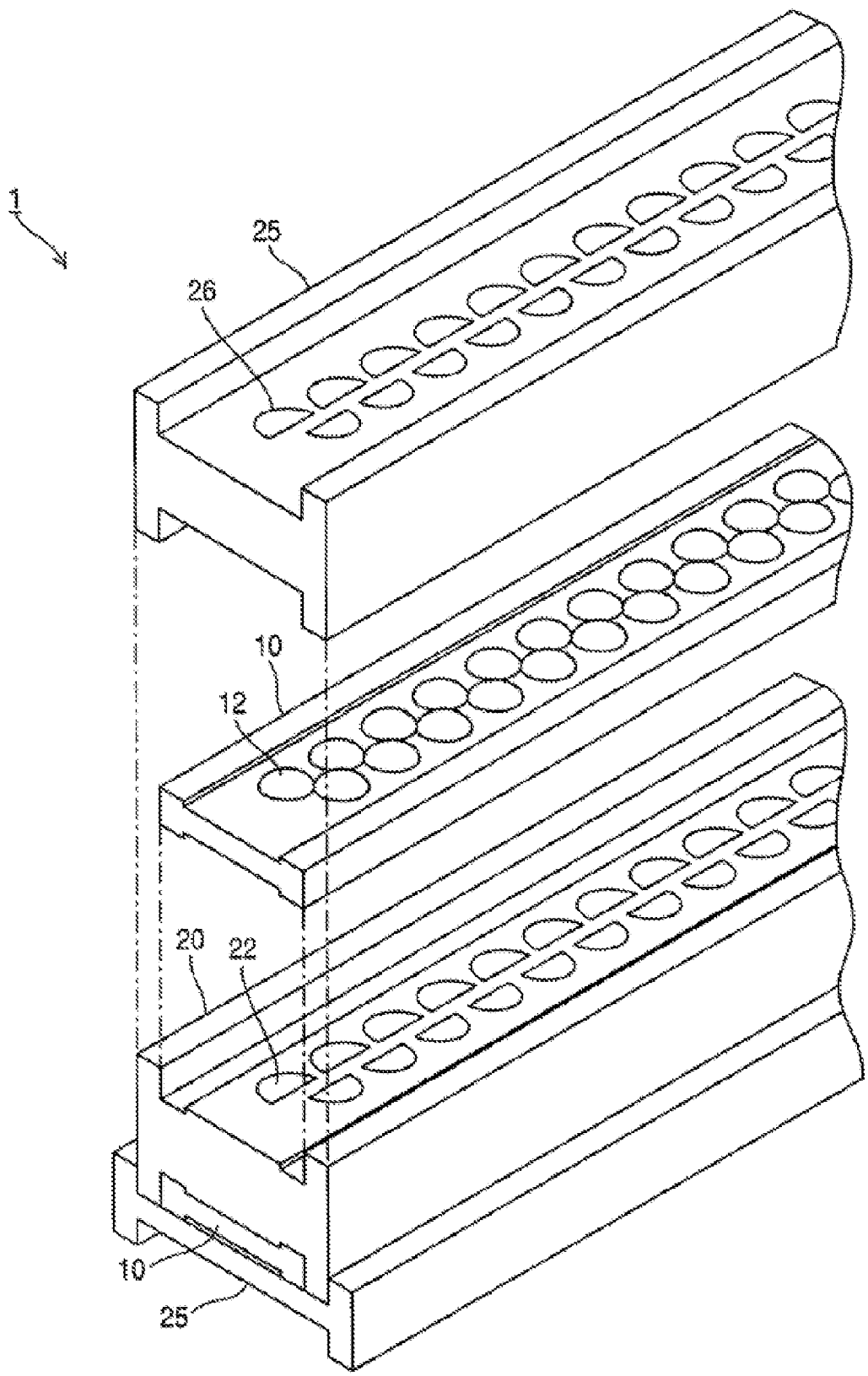
FIG. 5 is a schematic exploded perspective view showing the lens unit of the printer according to the first embodiment of the present invention.

A configuration of the lens unit 1 will be explained next with reference to FIG. 5. FIG. 5 is a schematic exploded perspective view showing the lens unit 1 of the printer 100 according to the first embodiment of the present invention.

As shown in FIG. 5, the lens unit 1 includes lens arrays 10 as assembly members of lens elements, a light blocking plate 20 as a light blocking member (a first light blocking member), and masks 25 (second light blocking members). The lens array 10 has a plurality of the micro lenses 12 as the lens elements arranged on a substantially straight line extending in a direction perpendicular to the optical axes thereof.

In the embodiment, the mask 25 includes a plurality of apertures 26 (second apertures) as opening portions or through holes with a substantially column shape formed in a flat plate and arranged in a substantially liner arrangement, so that light rays from an object (the light emitting portions) pass through the apertures 26. The light blocking plate 20 includes a plurality of intermediate apertures 22 (first apertures) as opening portions or through holes with a substantially column shape formed in a flat plate and arranged in a substantially liner arrangement, so that the light rays from the object (the light emitting portions) pass through the intermediate apertures 22.

In the embodiment, the micro lenses 12 of the lens array 10, the apertures 26 of the masks 25, and the intermediate apertures 22 of the light blocking plate 20 are arranged to extend in parallel to each other. Further, optical axes of the micro lenses 12, the apertures 26, and the intermediate apertures 22 extend substantially in a same direction. As shown in FIG. 5, in the lens unit 1, two of the lens arrays 10 are arranged to sandwich the light blocking plate 20, and the mask 25 is disposed on one of the lens arrays 10 on a side thereof opposite to the light blocking plate 20.

Figure 1:
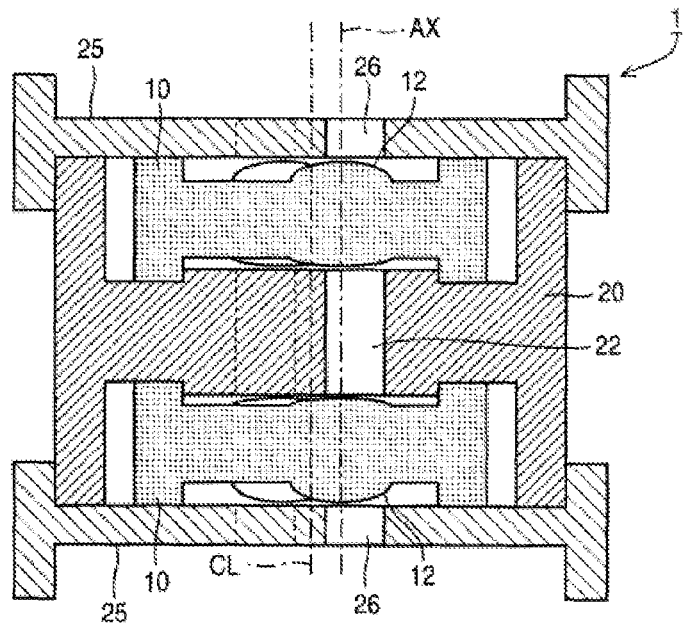
FIG. 1 is a schematic sectional view showing a lens unit of a printer according to a first embodiment of the present invention.

FIG. 1 is a schematic sectional view showing the lens unit 1 of the printer 100 taken along a plane perpendicular to the arrangement direction of the micro lenses 12 according to the first embodiment of the present invention. As shown in FIG. 1, in the lens unit 1, the micro lenses 12 are arranged such that the optical axis AX of the micro lenses 12 is aligned in a vertical direction. Further, the micro lenses 12 are arranged in the arrangement direction perpendicular to a sheet of the drawing. The centerline CL of the lens unit 1 is aligned with a direction (a width direction of the lens array 10) perpendicular to the arrangement direction and the optical axis AX of the micro lenses 12.

In the lens unit 1, the optical axis AX of two of the micro lenses 12 is aligned with each other. Further, the apertures 26 and the intermediate apertures 22 are situated at positions aligned with the optical axis AX. In other words, lens pairs each formed of two of the micro lenses 12 (a first lens and a second lens) are arranged so that the optical axis AX is aligned with each other, and are arranged in two rows in the direction perpendicular to the optical axis AX.

In the embodiment, the masks 25 as the light blocking members are situated on both sides of the lens unit 1, i.e., an object plane side and an image plane side (an upper side and a lower side in FIG. 1). Alternatively, the mask 25 may be disposed on one of the two sides.

Figure 6A:
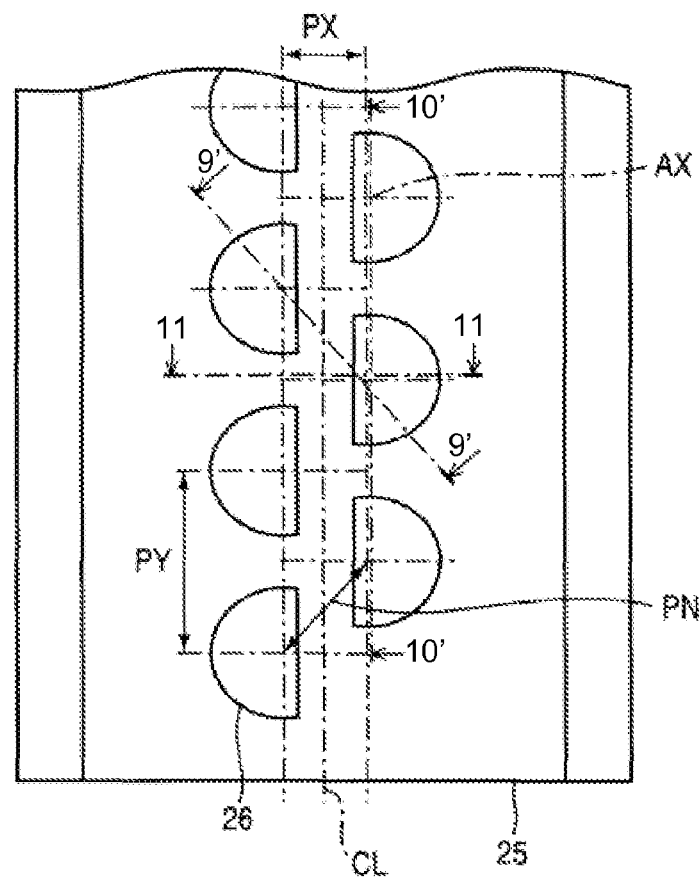
Figure 6B:
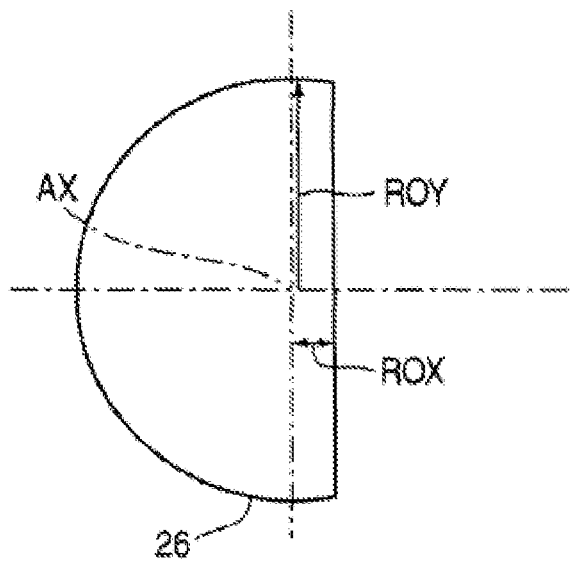

A configuration of the mask 25 will be explained with reference to FIGS. 6(a) and 6(b). FIGS. 6(a) and 6(b) are schematic views showing the mask 25 as the second light blocking member of the printer 100 according to the first embodiment of the present invention. More specifically, FIG. 6(a) is a schematic plan view of the mask 25, and FIG. 6(b) is a schematic plan view showing the aperture 26 thereof. FIGS. 6(a) and 6(b) show the mask 25 situated between the object plane and the lens array 10.

As shown in FIG. 6(a), the apertures 26 are arranged in the substantially linear arrangement with an arrangement interval PY therebetween. Further, the apertures 26 are arranged in two rows with an arrangement interval PX therebetween extending in a direction perpendicular to the arrangement direction of the apertures 26 and the optical axis AX of the micro lenses 12. Between the two rows, the apertures 26 are separated by a distance PN, and the distance PN is smaller than the arrangement interval PY (PN<PY).

As shown in FIG. 6(b), the aperture 26 has a shape having a circle with a radius ROY and a straight line in parallel to the arrangement direction of the aperture 26 at a position away from a center of the circle with the radius ROY by a distance ROX. Further, the aperture 26 is arranged such that the center of the circle with the radius ROY is aligned with the optical axis AX of the micro lens 12. The radius ROY and the distance ROX of the aperture 26 vary depending on a depth of the opening portion in the direction that the optical axis AX extends.

In the embodiment, when the mask 25 is situated between the lens array 10 and the image plane, the apertures 26 are arranged in a way similar to that in the case that the mask 25 is situated between the lens array 10 and the object plane as described above, except sizes of the radius ROY and the distance ROX. More specifically, as compared with FIG. 6(b), when the mask 25 is situated between the lens array 10 and the image plane, the radius ROY and the distance ROX are changed to a radius RIY and a distance RIX.

In the embodiment, the mask 25 is formed of a material blocking light emitted from the object (the LED elements 30). More specifically, the mask 25 is formed of polycarbonate with a resin injection molding method.

Figure 7A:
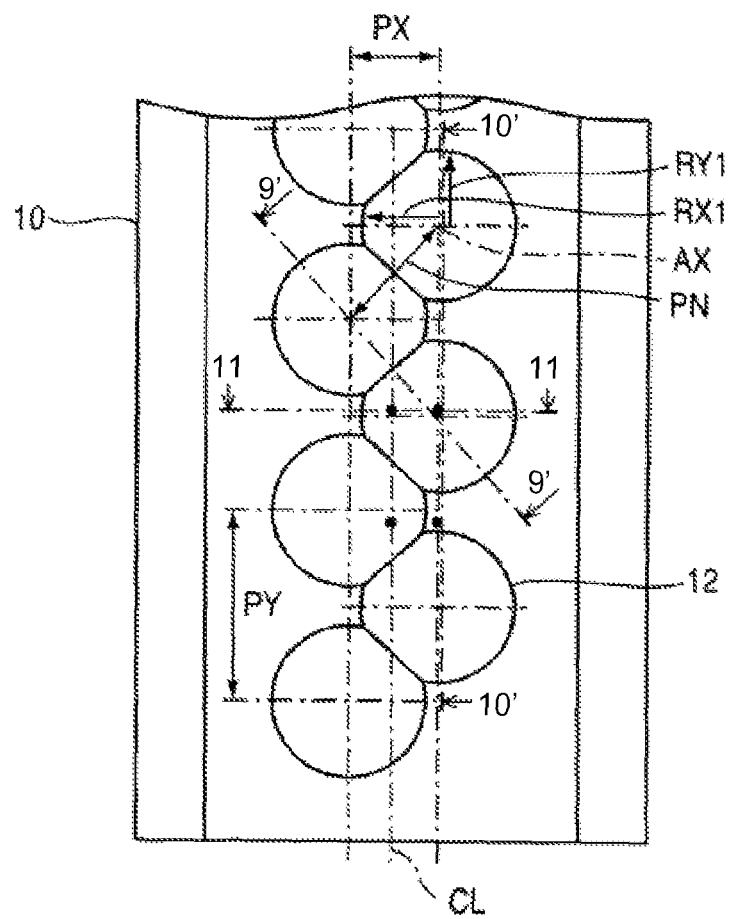
Figure 7B:
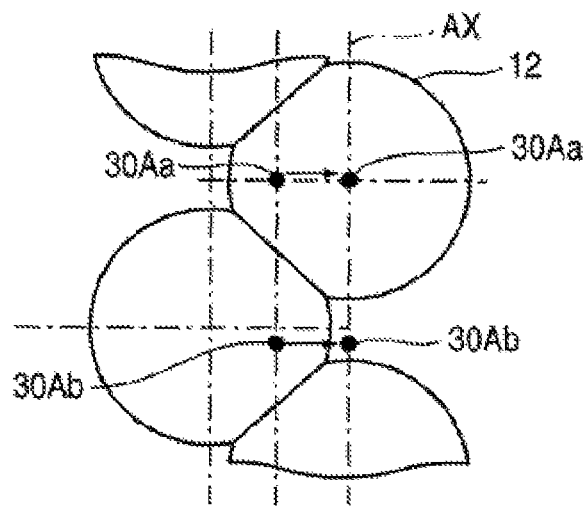

FIGS. 7(a) and 7(b) are schematic plan views showing the lens array 10 of the lens unit 1 according to the first embodiment of the present invention. More specifically, FIG. 7(a) is a schematic plan view of the lens array 10, and FIG. 7(b) is a schematic plan view showing the micro lenses 12 thereof.

As shown in FIG. 7(a), on the lens array 10, a plurality of the micro lenses 12 is arranged in a substantially linear arrangement with the arrangement interval PY. Further, the micro lenses 12 are arranged alternately in two rows with the arrangement interval PX in between extending in a direction perpendicular to the arrangement direction and the optical axis AX of the micro lenses 12. The micro lenses 12 are arranged in the two rows extending in parallel to a straight line on which a plurality of the LED elements 30 (not shown in FIG. 7(a)) is arranged. Further, the micro lenses 12 are arranged in the two rows away by a same distance from the straight line on which a plurality of the LED elements 30 (not shown in FIG. 7) is arranged.

As shown in FIG. 7(a), one of the micro lenses 12 is separated from another of the micro lenses 12 arranged adjacently by a distance PN, and the distance PN is smaller than the arrangement interval PY (PN<PY). Accordingly, one of the micro lenses 12 on one of the two rows is overlapped with one of the micro lenses 12 on the other of the two rows. A portion connecting between the micro lenses 12 overlapping with each other has a shape cut with a plane in parallel to the optical axis AX. Each of the micro lenses 12 has a shape having a circle with a radius RY1 and straight lines at positions away from a center of the circle with the radius RY1 by a distance PN/2.

In the embodiment, when the lens array 10 is on the side of the image plane, the micro lenses 12 are arranged in a similar way, except sizes of the radius RY1 and a radius RX1 (described later). More specifically, as compared with FIG. 7(a), when the lens array 10 is situated on the side of the image plane, the radius RY1 and the radius RX1 are changed to a radius RY2 and a radius RX2.

In the embodiment, the lens array 10 of the lens unit 1 may be formed of a material transparent to the light rays of the LED elements 30. More specifically, the lens array 10 is formed of an optical resin of a cyclo-olefin type (ZEONEX E48R, a product of Zeon Corporation), so that a plurality of the micro lenses 12 is integrally formed using the optical resin through an injection molding.

In the embodiment, each of the micro lenses 12 has a rotationally symmetrical high order aspheric surface expressed with the equation (1).

$$Z(r) = \frac{\frac{r^2}{C}}{1+\sqrt{1-(1+k)\left(\frac{r}{C}\right)^2}} + \sum_{m=2}^{l} A_{2m}r^{2m} \quad (1)$$

where k is the conic constant, C is a curvature radius, A is an aspheric surface coefficient, and l and m are positive integers. In the equation (1), the function z(r) represents a rotational coordinate with a radial coordinate r, in which an axis thereof extends in parallel to the optical axes of the micro lenses 12. In the rotational coordinate, an origin is located at a top of a curved surface of each of the micro lenses 12; a positive number is assigned in a direction toward the micro lenses 12; and a negative number is assigned in a direction toward an air layer.

In the embodiment, the radius r is represented with an equation (2) using values of an X coordinate and a Y coordinate as follows:

$$r = \sqrt{X^2 + Y^2} \quad (2)$$

Figure 8A:
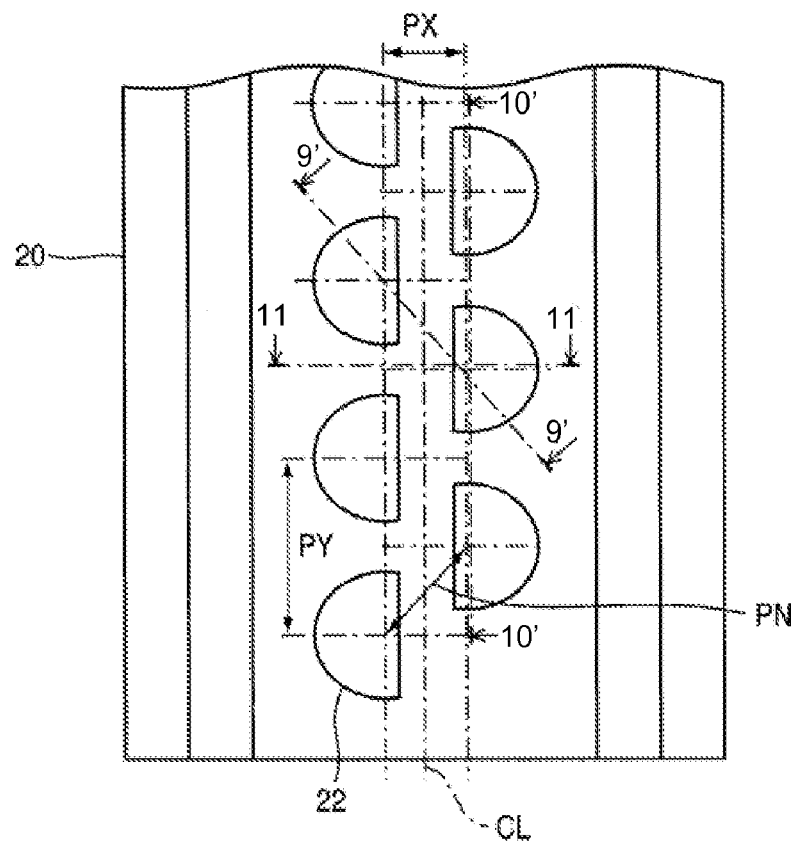
Figure 8B:
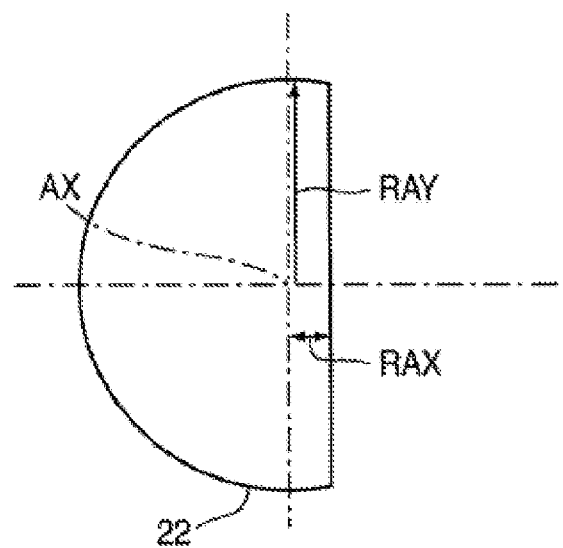

FIGS. 8(a) and 8(b) are schematic plan views showing the light blocking plate 20 as the first light blocking member of the lens unit 1 according to the first embodiment of the present invention. More specifically, FIG. 8(a) is a schematic plan view of the light blocking plate 20, and FIG. 8(b) is a schematic plan view showing the intermediate apertures 22 thereof.

As shown in FIG. 8(a), in the light blocking plate 20, the intermediate apertures 22 are arranged in the substantially linear arrangement with the arrangement interval PY therebetween. Further, the intermediate apertures 22 are arranged in two rows with the arrangement interval PX therebetween extending in a direction perpendicular to the arrangement direction of the intermediate apertures 22 and the optical axis AX of the micro lenses 12. Between the two rows, the intermediate apertures 22 are separated by the distance PN, and the distance PN is smaller than the arrangement interval PY (PN<PY).

As shown in FIG. 8(b), the intermediate aperture 22 has a shape having a circle with a radius RAY and a straight line in parallel to the arrangement direction of the intermediate apertures 22 at a position away from a center of the circle with the radius RAY by a distance RAX. Further, the intermediate aperture 22 is arranged such that the center of the circle with the radius RAY is aligned with the optical axis AX of the micro lens 12.

In the embodiment, the light blocking plate 20 is formed of a material blocking light emitted from the object (the LED elements 30). More specifically, the light blocking plate 20 is formed of polycarbonate with a resin injection molding method.

Figure 9:
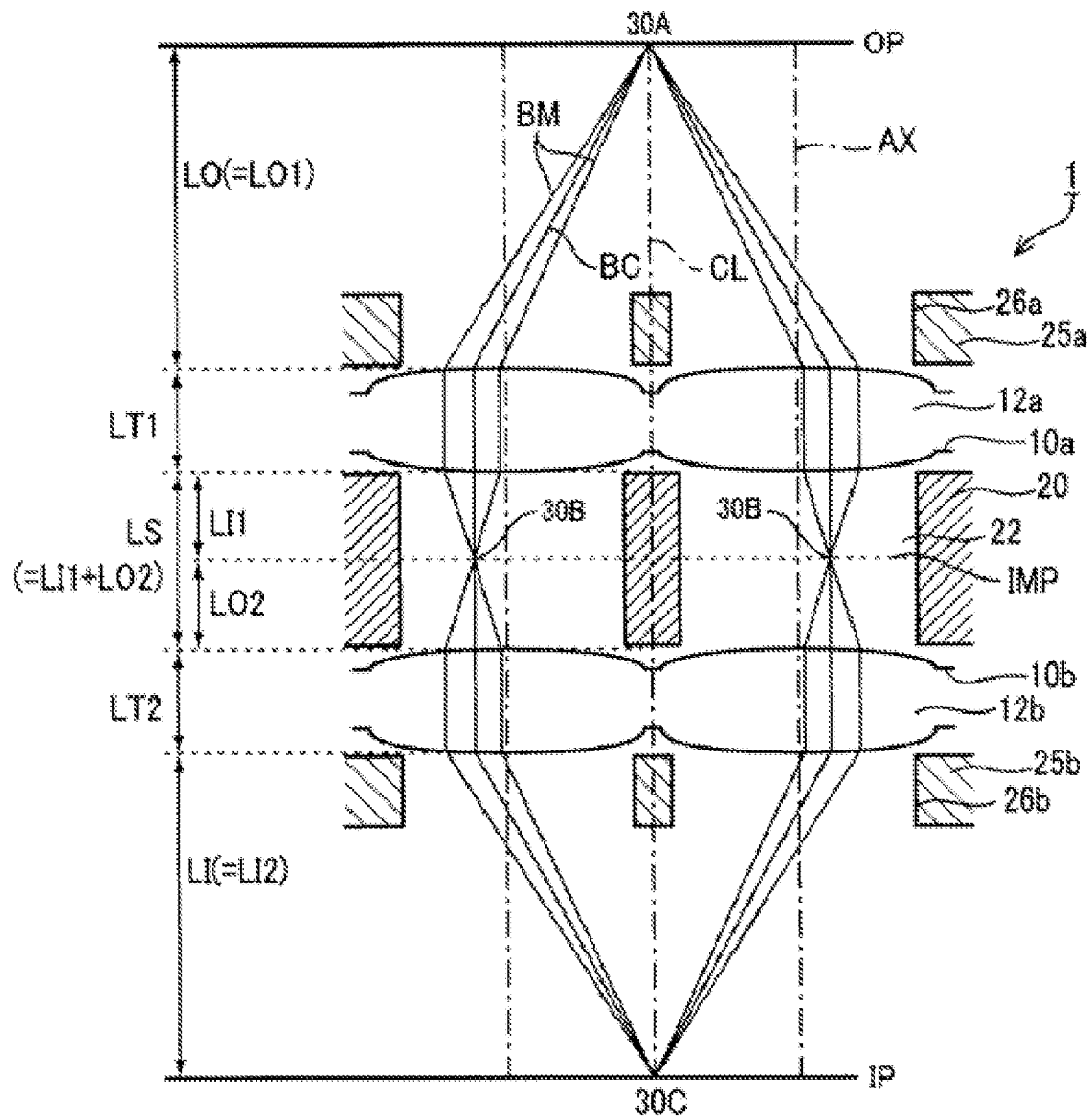
FIG. 9 is a schematic sectional view No. 1 showing an operation of the lens unit taken along a line 9'-9' in FIGS. 6(a), 7(a) and 8(a) according to the first embodiment of the present invention.

An operation of the lens unit 1 will be explained next with reference to FIG. 9. FIG. 9 is a schematic sectional view No. 1 showing the operation of the lens unit 1 taken along a line 9'-9' in FIGS. 6(a), 7(a) and 8(a) according to the first embodiment of the present invention. More specifically, FIG. 9 is a schematic sectional view showing the lens unit 1 including the lens array 10, an object plane OP, and an image plane IP, and the sectional view is taken along a plane containing the optical axis AX of two of the micro lenses 12 arranged next to with each other.

As shown in FIG. 9, a first lens array 10a is situated at a position away from the object plane OP of the lens unit 1 by a distance LO. A second lens array 10b is situated away from the first lens array 10a by a distance LS to face the first lens array 10a. A mask 25a on an object plane side is situated between the first lens array 10a and the object plane OP. A mask 25b on an image plane side is situated between the second lens array 10b and the image plane IP. Further, the light blocking plate 20 is situated between the first lens array 10a and the second lens array 10b.

In the embodiment, the first lens array 10a and the second lens array 10b are arranged such that an optical axis of the second lens array 10b is aligned with an optical axis of the first lens array 10a. The mask 25a and the mask 25b are arranged such that apertures 26a on the object plane side and apertures 26b on the image plane side are situated on the optical axis AX.

In the embodiment, a first micro lens 12a has a thickness LT1, so that the first micro lens 12a forms an image of an object 30A as an intermediate image 30B at a distance LO1 in the direction of the optical axis AX thereof on an intermediate image plane IMP at a distance LI1 in the direction of the optical axis AX thereof. Further, a second micro lens 12a has a thickness LT2, so that the second micro lens 12a forms a projected image 30C of the intermediate image 30B on the intermediate image plane IMP at a distance LO2 on the image plane IP at a distance LI2 in the direction of the optical axis AX thereof.

In the embodiment, the first micro lens 12a is arranged such that the distance LO from the object plane OP of the lens unit 1 is equal to the distance LO1 (LO=LO1). Further, the first micro lens 12a and the second micro lens 12b are arranged such that a distance LS therebetween is equal to a sum of the distance LI1 and the distance LO2 (LS=LI1+LO2). Further, the second micro lens 12b is arranged such that the distance L1 to the image plane IP of the lens unit 1 is equal to the distance LI2 (LI=LI2).

In the embodiment, the first micro lens 12a may have a configuration the same as that of the second micro lens 12b. In this case, the first micro lens 12a and the second micro lens 12b both have the thickness LT1, and the distance LO between the object plane OP of the lens unit 1 and the first micro lens 12a is equal to the distance LO1 (LO=LO1). Further, the first micro lens 12a may have a shape with a curved surface on the side of the object plane OP the same as that of the second micro lens 12b on the side of the image plane IP, so that the curved surface of the first lens array 10a faces that of the second lens array 10b. In this case, the distance LO2 between the intermediate image plane IMP and the second micro lens 12b is equal to the distance LI1 (LO2=LI1).

In the embodiment, the first micro lens 12a and the second micro lens 12b are arranged such that the distance LS therebetween is equal to two times the distance LI1 (LS=2×LI1). The second micro lens 12b is arranged such that the distance L1 to the image plane IP of the lens unit 1 is equal to the distance LO1 (L1=L01).

An operation of the printer 100 will be explained next with reference to FIG. 2. The power source (not shown) applies a voltage to the charging roller 42, so that the charging roller 42 charges the surface of the photosensitive drum 41 of the printer 100. When the photosensitive drum 41 rotates, and the surface of the photosensitive drum 41 thus charged approaches the LED head 3, the LED head 3 exposes the surface of the photosensitive drum 41, thereby forming the static latent image on the surface of the photosensitive drum 41. Then, the developing device 5 develops the static latent image, thereby forming the toner image on the surface of the photosensitive drum 41.

After the sheet supply roller 61 picks up the sheet 101 set in the sheet supply cassette 60, the transport rollers 62 and 63 transport the sheet 101 to the transfer roller 80 and the transfer belt 81. When the photosensitive drum 41 rotates and the toner image on the surface of the photosensitive drum 41 approaches the transfer roller 80 and the transfer belt 81, the transfer roller 80 and the transfer belt 81 with a voltage applied from the power source (not shown) transfer the toner image on the surface of the photosensitive drum 41 to the sheet 101.

After the toner image is transferred to the sheet 101, the transfer belt 81 rotates to transport the sheet 101 to the fixing device 9, so that the fixing device 9 presses and heats the toner image on the sheet 101, thereby fixing the toner image to the sheet 101. After the toner image is fixed to the sheet 101, the transport roller 64 and the discharge roller 65 discharge the sheet 101 to the discharge unit 7, thereby completing the operation of the printer 10.

An operation of the LED head 3 as the exposure device will be explained next with reference to FIG. 4. As shown in FIG. 4, when the control unit of the printer 100 sends a control signal of the LED head 3 according to the image data, the driver ICs 31 control the LED elements 30 to emit light with a specific luminescence amount according to the control signal. When the LED elements 30 emit light, light passes through the lens unit 1, thereby forming an image on the photosensitive drum 41.

The operation of the lens unit 1 will be explained next in more detail with reference to FIG. 9. As shown in FIG. 9, when the light rays of the LED elements 30 as the object 30A pass through the first micro lens 12a, the first micro lens 12a forms the intermediate image 30B on the intermediate image plane IMP at the distance LI1 in the optical axis direction thereof. At this moment, the light blocking plate 20 and the mask 25a on the object plane side block a part of the light rays not contributing to the formation of the intermediate image 30B.

When the second micro lens 12b forms the projected image 30C as the image of the intermediate image 30B on the image plane IP, the projected image 30C of the object 30A is formed on the image plane IP. The intermediate image 30B formed with the first micro lens 12a is an inverted reduced-size image of the object 30A, and the projected image 30C formed with the second micro lens 12b is an inverted enlarged image of the intermediate image 30B.

In the embodiment, chief rays of the light rays from each point on the object plane are parallel with each other between the first micro lens 12a and the second micro lens 12b, i.e., telecentric. Accordingly, the lens unit 1 forms an erected same-size image of the object 30A. When the second micro lens 12b has a shape the same as that of the second micro lens 12b, the lens unit 1 forms an erected same-size image of the object 30A as well.

As described above, in the embodiment, when the light rays of the LED elements 30 as the object 30A pass through the first micro lens 12a, the first micro lens 12a forms the intermediate image 30B on the intermediate image plane IMP at the distance LS/2 in the optical axis direction thereof. Further, the second micro lens 12b forms the projected image 30C as the image of the intermediate image 30B on the image plane IP. The first micro lens 12a and the second micro lens 12b are arranged to be telecentric in between.

The operation of the lens unit 1 will be explained next in more detail with reference to FIGS. 7(a) and 7(b), 10, and 17. FIGS. 7(a) and 7(b) are the schematic plan views showing the lens array 10 of the lens unit 1 according to the first embodiment of the present invention, and showing a positional relationship between the object (the LED elements 30) and the optical axis AX.

In FIG. 7(b), an object 30Aa represents one of the LED elements 30 at a position closest to the optical axis AX of the first micro lens 12a, and an object 30Aa' represents an object on the line 10'-10' shifted in parallel from the object 30Aa in a direction perpendicular to the line 10'-10' and the optical axis AX. Further, an object 30Ab represents another one of the LED elements 30 at a position outermost of a field of view of the first micro lens 12a, and an object 30Ab' represents an object on the line 10'-10' shifted in parallel from the object 30Ab in a direction perpendicular to the line 10'-10' and the optical axis AX.

Figure 10:
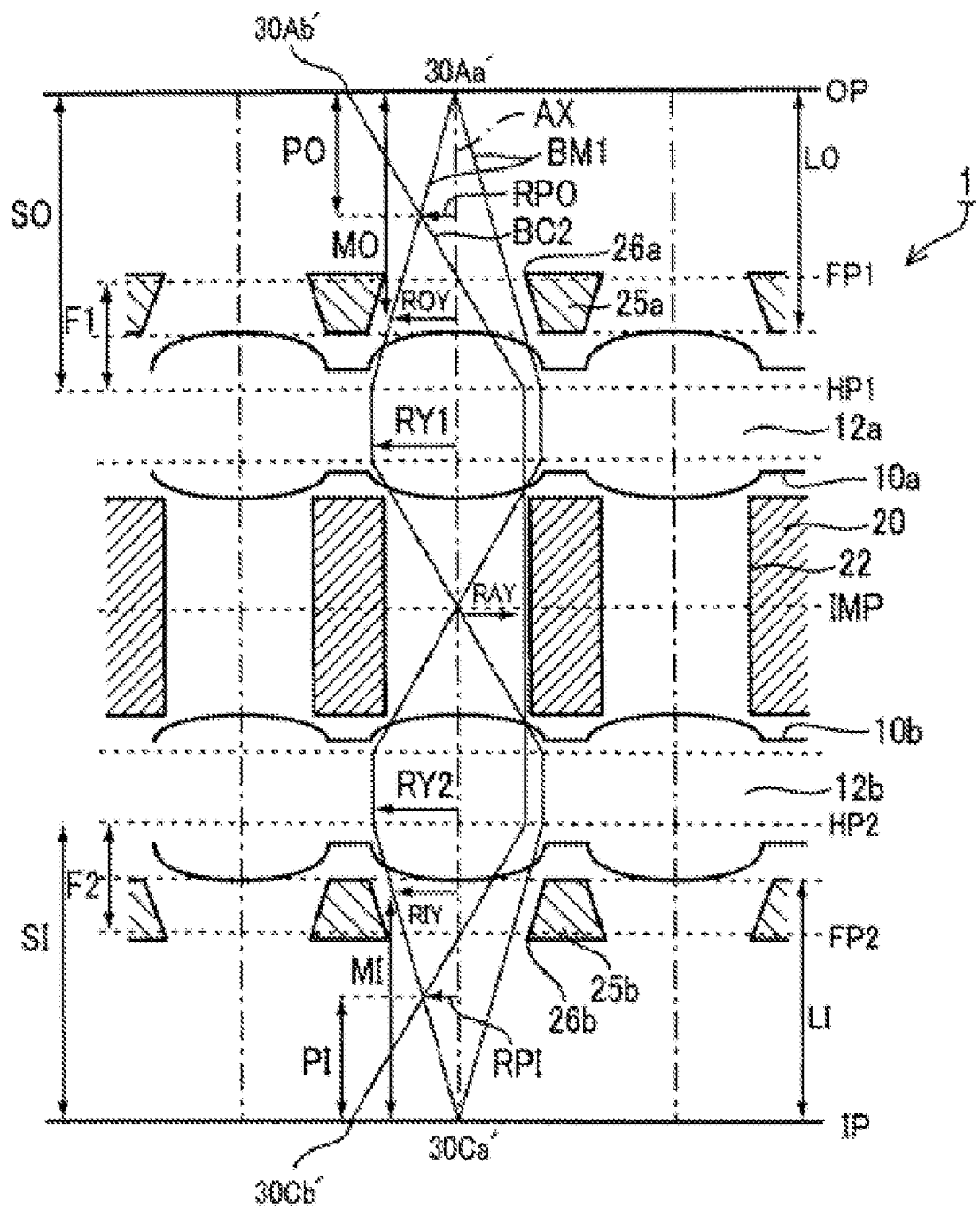
FIG. 10 is a schematic sectional view No. 2 showing the operation of the lens unit taken along a line 10'-10' in FIGS. 6(a), 7(a) and 8(a) according to the first embodiment of the present invention.
Figure 17:
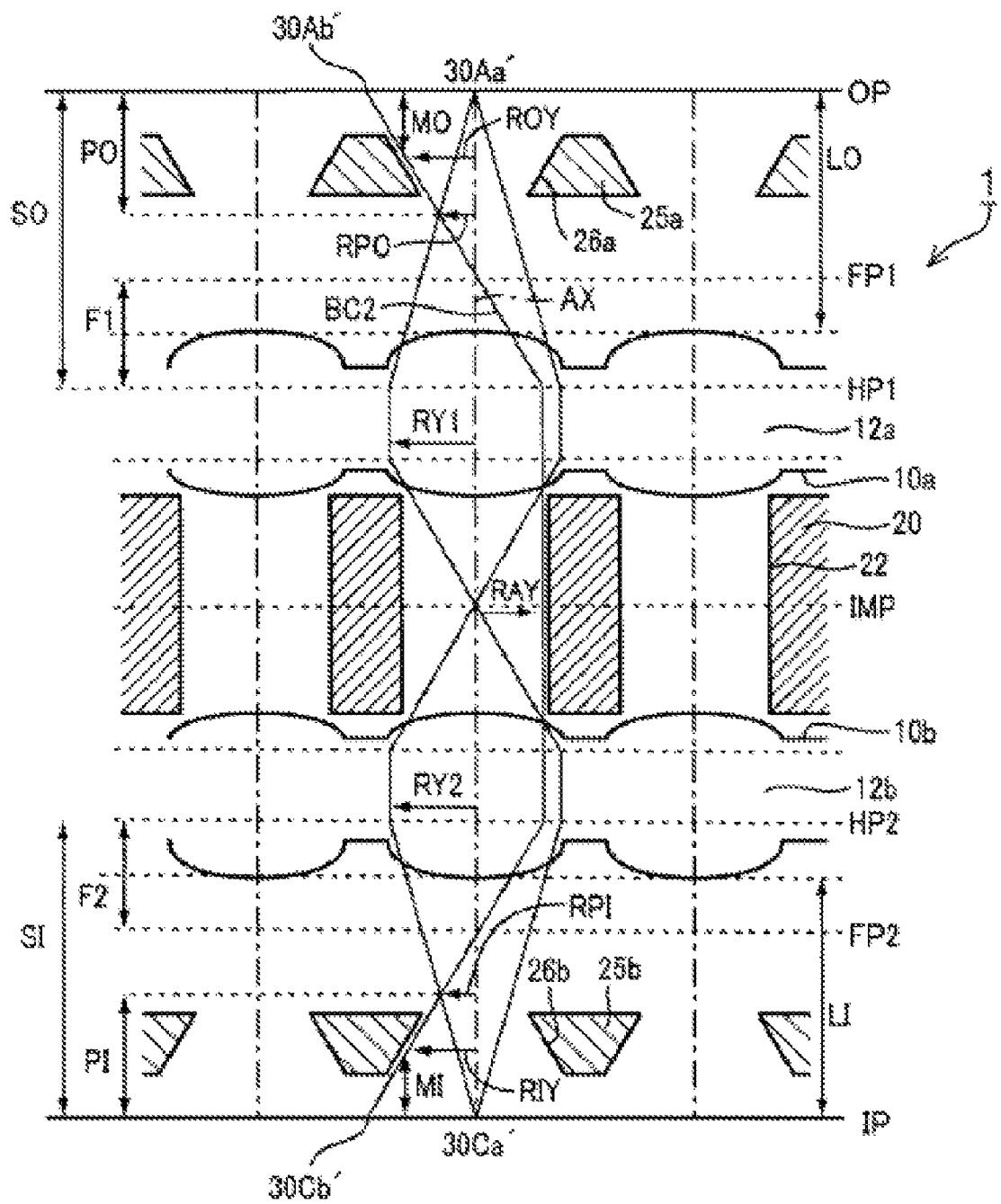
FIG. 17 is a schematic sectional view No. 4 showing the operation of the lens unit taken along the line 10'-10' in FIGS. 6(a), 7(a) and 8(a) according to the first embodiment of the present invention.

FIG. 10 is a schematic sectional view No. 2 showing the operation of the lens unit 1 taken along a line 10'-10' in FIGS. 6(a), 7(a) and 8(a) according to the first embodiment of the present invention. FIG. 17 is a schematic sectional view No. 4 showing the operation of the lens unit 1 taken along the line 10'-10' in FIGS. 6(a), 7(a) and 8(a) according to the first embodiment of the present invention.

As shown in FIGS. 10 and 17, the lens unit 1 forms a projected image 30Ca' and a projected image 30Cb' of the object 30Aa' and the object 30Ab', respectively. Further, in FIGS. 10 and 17, peripheral light rays BM1 are outermost light rays incident on the first micro lens 12a to contribute the formation of the projected image 30Ca', and a chief ray BC2 is a light ray emitted from the object 30Aa' to contribute the formation of the projected image 30Cb'.

As described above, the first micro lens 12a and the second micro lens 12b are arranged to be telecentric in between. Accordingly, the chief ray BC2 is in parallel to the optical axis AX between the first micro lens 12a and the second micro lens 12b. Further, the object 30Ab' represents the image at the position outermost of the field of view of the first micro lens 12a. Accordingly, the chief ray BC2 passes through a position near an inner wall of the intermediate apertures 22, and the light blocking plate 20 blocks peripheral light rays of the object 30Ab'.

As shown in FIGS. 10 and 17, the aperture 26a on the object plane side is away from the object plane OP by a distance MO, and the aperture 26b on the image plane side is away from the image plane IP by a distance MI. Further, the aperture 26a on the object plane side away from the object plane OP by the distance MO has an opening size with a half value of ROY, and the aperture 26b on the image plane side away from the image plane IP by the distance MI has an opening size with a half value of RIY. The first micro lens 12a has a first focal plane FP1 and a first principal plane HP1, and the second micro lens 12b has a second focal plane FP2 and a second principal plane HP2.

In the embodiment, the object plane OP is away from the first principal plane HP1 by a distance SO, and the image plane IP is away from the second principal plane HP2 by a distance SI. The first principal plane HP1 is away from the first focal plane FP1 by a distance F1, and the second principal plane HP2 is away from the second focal plane FP2 by a distance F2. As described above, the first micro lens 12a has the radius RY1 in the arrangement direction thereof, and the second micro lens 12b has the radius RY2 in the arrangement direction thereof. Further, the intermediate aperture 22 has the opening with the radius RAY equal to a half of an opening width of the intermediate aperture 22 and a distance between the optical axis and the inner wall of the intermediate aperture 22.

As shown in FIG. 10, the distance MO between the aperture 26a on the object plane side and the object plane OP is equal to or greater than a distance PO between the object plane OP and a crossing point of the peripheral light ray BM1 and the chief ray BC1 between the object plane OP and the first micro lens 12a. Further, the distance MI between the aperture 26b on the image plane side and the image plane IP is equal to or greater than a distance PI between the image plane IP and a crossing point of the peripheral light ray BM1 and the chief ray BC1 between the image plane IP and the second micro lens 12b.

As shown in FIG. 17, the distance MO between the aperture 26a on the object plane side and the object plane OP is equal to or smaller than the distance PO. Further, the distance MI between the aperture 26b on the image plane side and the image plane IP is equal to or smaller than the distance PI.

As shown in FIG. 10, when a light ray emitted from the object 30Aa' passes through outside the peripheral light ray BM1 between the object plane OP and the first micro lens 12a, the light ray is incident on a periphery of the first micro lens 12a. Accordingly, a part of the light ray reaches the image plane IP as a stray light ray, thereby lowering contrast of the projected image 30Ca'. To this end, the aperture 26a on the object plane side is arranged to block the light ray passing through outside the peripheral light ray BM1 between the object plane OP and the first micro lens 12a.

Further, the peripheral light ray BM1 tends to spread while being away from the object plane OP. Accordingly, the aperture 26a on the object plane side is configured to have an opening on the object plane side smaller than an opening on a side of the first micro lens 12a. With the configuration, it is possible to effectively block the light ray as the stray light ray from lowering contrast without blocking the light ray contributing to the formation of the projected image 30Ca'.

Further, as shown in FIG. 10, when a light ray passes through outside the peripheral light ray BM1 between the image plane IP and the second micro lens 12b, the light ray reaches the image plane IP, thereby lowering contrast of the projected image 30Ca'. To this end, the aperture 26b on the image plane side is arranged to block the light ray passing through outside the peripheral light ray BM1 between the image plane IP and the second micro lens 12b.

Further, the peripheral light ray BM1 tends to converge while being approaching the image plane IP. Accordingly, the aperture 26b on the image plane side is configured to have an opening on the image plane side smaller than an opening on a side of the second micro lens 12b. With the configuration, it is possible to effectively block the light ray as the stray light ray from lowering contrast without blocking the light ray contributing to the formation of the projected image 30Ca'.

As shown in FIG. 17, when a light ray emitted from the object 30Ab' passes through a position closer to the optical axis AX than the chief ray BC2, and the light ray is incident on the first micro lens 12a, a part of the light ray reaches the image plane IP as a stray light ray, thereby lowering contrast of the projected image 30Cb'. To this end, the aperture 26a on the object plane side is arranged to block the light ray passing through a position closer to the optical axis AX than the chief ray BC2 between the object plane OP and the first micro lens 12a.

Further, the chief ray BC2 tends to approach the optical axis AX while being away from the object plane OP. Accordingly, the aperture 26a on the object plane side is configured to have an opening on the object plane side larger than an opening on a side of the first micro lens 12a. With the configuration, it is possible to effectively block the light ray as the stray light ray from lowering contrast without blocking the light ray contributing to the formation of the projected image 30Cb'.

Further, as shown in FIG. 17, when a light ray passes through outside the chief ray BC2 on the image plane between the image plane IP and the second micro lens 12b, the light ray reaches the image plane IP, thereby lowering contrast of the projected image 30Cb'. To this end, the aperture 26b on the image plane side is arranged to block the light ray passing through outside the chief ray BC2 between the image plane IP and the second micro lens 12b.

Further, the chief ray BC2 tends to approach the optical axis AX while being approaching the image plane IP. Accordingly, the aperture 26b on the image plane side is configured to have an opening on the image plane side larger than an opening on a side of the second micro lens 12b. With the configuration, it is possible to effectively block the light ray as the stray light ray from lowering contrast without blocking the light ray contributing to the formation of the projected image 30Cb'.

In the embodiment, the aperture 26a on the object plane side and the aperture 26b on the image plane side are arranged on the both sides, i.e., the object plane side and the image plane side, of the lens unit 1 (an upper side and a lower side in FIGS. 10 and 17). Alternatively, the aperture 26a on the object plane side and the aperture 26b on the image plane side may be arranged on one side.

A size of the opening of the aperture 26a on the object plane side and the aperture 26b on the image plane side will be explained next.

As shown in FIG. 10, the peripheral light ray BM1 at the distance MO from the object plane OP is away from the optical axis AX by a distance BMO given by the following equation:

$$BMO = RY1/SO \times MO$$

where RY1 is the radius of the first micro lens 12a. Further, the peripheral light ray BM1 at the distance MI from the image plane IP is away from the optical axis AX by a distance BMI given by the following equation:

$$BMI = RY2/SI \times MI$$

where RY2 is the radius of the second micro lens 12b.

In the embodiment, it is supposed that the opening size ROY of the aperture 26a on the object plane side at a position away from the object plane OP by the distance MO is within a range expressed with the following equation (3):

$$\frac{RY1}{SO} MO < ROY < \frac{PY}{2} \quad (3)$$

Further, it is supposed that the opening size RIY of the aperture 26b on the image plane side at a position away from the image plane IP by the distance MI is within a range expressed with the following equation (4):

$$\frac{RY2}{SI} MI < RIY < \frac{PY}{2} \quad (4)$$

In the embodiment, when the opening size ROY of the aperture 26a on the object plane side and the opening size RIY of the aperture 26b on the image plane side are within the ranges expressed with the equations (3) and (4), it is possible to effectively block the light ray not contributing to the formation of the projected image, thereby improving the resolution of the lens unit 1.

As shown in FIG. 17, the chief ray BC2 at the distance MO from the object plane OP is away from the optical axis AX by a distance BCO given by the following equation (5):

$$BCO = \frac{RAY}{F1}(SO - F1 - MO) \quad (5)$$

Further, the chief ray BC2 at the distance MI from the image plane IP is away from the optical axis AX by a distance BCI given by the following equation (6):

$$BCI = \frac{RAY}{F2}(SI - F2 - MI) \quad (6)$$

In the embodiment, it is supposed that the opening size ROY of the aperture 26a on the object plane side at a position away from the object plane OP by the distance MO is within a range expressed with the following equation (7):

$$\frac{RAY}{F1}(SO - F1 - MO) < ROY < \frac{PY}{2} \quad (7)$$

Further, it is supposed that the opening size RIY of the aperture 26b on the image plane side at a position away from the image plane IP by the distance MI is within a range expressed with the following equation (8):

$$\frac{RAY}{F2}(SI - F2 - MI) < RIY < \frac{PY}{2} \quad (8)$$

In the embodiment, when the opening size ROY of the aperture 26a on the object plane side and the opening size RIY of the aperture 26b on the image plane side are within the ranges expressed with the equations (7) and (8), it is possible to effectively block the light ray not contributing to the formation of the projected image, thereby improving the resolution of the lens unit 1.

As shown in FIGS. 10 and 17, between the object plane OP and the first micro lens 12a, the peripheral light ray BM1 and the chief ray BC2 cross at a position away from the object plane OP by a distance PO given by the following equation (9):

$$PO = \frac{SO - F1}{RY1 \cdot F1 + SO \cdot RAY} RAY \cdot SO \quad (9)$$

Further, between the object plane OP and the first micro lens 12a, the peripheral light ray BM1 and the chief ray BC2 cross at a position away from the optical axis AX by a distance RPO given by the following equation (10):

$$RPO = \frac{SO - F1}{RY1 \cdot F1 + SO \cdot RAY} RAY \cdot RY1 \quad (10)$$

Accordingly, when the distance MO is greater than the distance PO, the opening size ROY is set within the range represented with the equation (3) as shown in FIG. 10. Further, the aperture 26a on the object plane side is configured to have the opening on the object plane side smaller than the opening on the side of the first micro lens 12a.

Further, when the distance MO is smaller than the distance PO, the opening size ROY is set within the range represented with the equation (7) as shown in FIG. 17. Further, the aperture 26a on the object plane side is configured to have the opening on the object plane side larger than the opening on the side of the first micro lens 12a.

As shown in FIGS. 10 and 17, between the image plane IP and the second micro lens 12b, the peripheral light ray BM1 and the chief ray BC2 cross at a position away from the image plane IP by a distance PI given by the following equation (11):

$$PI = \frac{SI - F2}{RY2 \cdot F2 + SI \cdot RAY} RAY \cdot SI \quad (11)$$

Further, between the image plane IP and the second micro lens 12b, the peripheral light ray BM1 and the chief ray BC2 cross at a position away from the optical axis AX by a distance RPI given by the following equation (12):

$$RPI = \frac{SI - F2}{RY2 \cdot F2 + SI \cdot RAY} RAY \cdot RY2 \quad (12)$$

Accordingly, in the embodiment, when the distance MI is greater than the distance PI, the opening size RIY is set within the range represented with the equation (4) as shown in FIG. 10. Further, the aperture 26b on the image plane side is configured to have the opening on the image plane side smaller than the opening on the side of the second micro lens 12b.

Further, when the distance MI is smaller than the distance PI, the opening size RIY is set within the range represented with the equation (8) as shown in FIG. 17. Further, the aperture 26b on the image plane side is configured to have the opening on the image plane side larger than the opening on the side of the second micro lens 12b.

Figure 11:
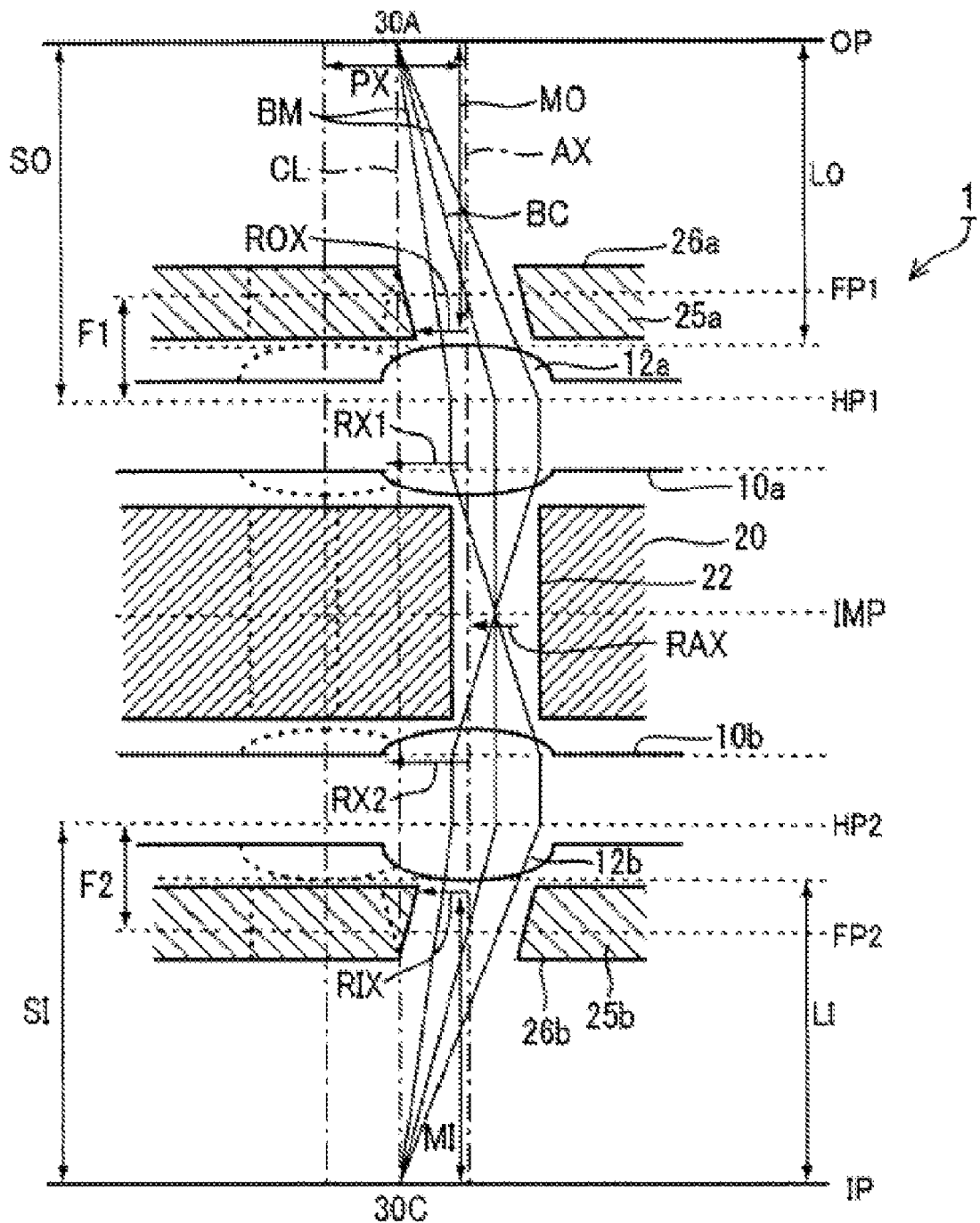
FIG. 11 is a schematic sectional view No. 3 showing the operation of the lens unit taken along a line 11-11 in FIGS. 6(a), 7(a) and 8(a) according to the first embodiment of the present invention.

The operation of the lens unit 1 will be explained next in more detail with reference to FIG. 11. FIG. 11 is a schematic sectional view No. 3 showing the operation of the lens unit 1 taken along a line 11-11 in FIGS. 6(a), 7(a) and 8(a) according to the first embodiment of the present invention.

As shown in FIG. 11, when the light rays form the projected image 30C of the object 30A, the light rays include a chief ray BC and peripheral light rays BM passing through an outermost position relative to the first micro lens 12a. As described above, the first micro lens 12a and the second micro lens 12b are arranged to be telecentric in between. Accordingly, the chief ray BC is in parallel to the optical axis AX between the first micro lens 12a and the second micro lens 12b.

In the embodiment, the first micro lens 12a has the radius RX1 in an x direction from the optical axis AX toward the centerline CL of the lens unit 1 in the width direction thereof.

Further, the second micro lens 12b has a radius RX2 in the x direction, and the optical axis AX is away from the inner wall of the intermediate aperture 22 by a distance RAX in the x direction.

As described above, the aperture 26a on the object plane side is away from the object plane OP by the distance MO, and the aperture 26b on the image plane side is away from the image plane IP by the distance MI. Further, the optical axis AX at the distance MO from the object plane OP is away from the inner wall of the aperture 26a on the object plane side by a distance ROX in the x direction, and the optical axis AX at the distance MI from the image plane IP is away from the inner wall of the aperture 26b on the image plane side by a distance RIX in the x direction.

As shown in FIG. 11, when the light ray emitted from the object 30A passes through outside the peripheral light ray BM near the centerline CL between the object plane OP and the first micro lens 12a, the light ray is incident on the periphery of the first micro lens 12a. Further, when the light ray emitted passes through outside the peripheral light ray BM near the centerline CL between the image plane OP and the second micro lens 12b, a part of the light ray reaches the image plane IP as a stray light ray, thereby lowering contrast of the projected image 30C.

To this end, the aperture 26a on the object plane side or the aperture 26b on the image plane side is arranged between the object plane OP and the first micro lens 12a or the image plane IP and the second micro lens 12b to block the light ray passing through outside the peripheral light ray BM near the centerline CL.

As shown in FIG. 11, the peripheral light ray BM at the distance MO from the object plane OP is away from the optical axis AX by a distance BMO given by the following equation (13):

$$BMO = \left(\frac{PX}{2} - RAX\right)\frac{MO}{SO} \quad (13)$$

In the embodiment, it is supposed that the opening size ROX of the aperture 26a on the object plane side is within a range expressed with the following equation (14):

$$\left(\frac{PX}{2} - RAX\right)\frac{MO}{SO} < ROX < RX1 \quad (14)$$

In the embodiment, when the opening size ROX of the aperture 26a is within the ranges expressed with the equations (14), it is possible to effectively block the light ray lowering the contrast and not contributing to the formation of the projected image, thereby improving the resolution of the lens unit 1.

Further, the peripheral light ray BM at the distance MI from the image plane IP is away from the optical axis AX by a distance BMI given by the following equation (15):

$$BMI = \left(\frac{PX}{2} - RAX\right)\frac{MI}{SI} \quad (15)$$

In the embodiment, it is supposed that the opening size RIX of the aperture 26b on the image plane side is within a range expressed with the following equation (16):

$$\left(\frac{PX}{2} - RAX\right)\frac{MI}{SI} < RIX < RX2 \quad (16)$$

In the embodiment, when the opening size RIX of the aperture 26b is within the ranges expressed with the equations (16), it is possible to effectively block the light ray lowering the contrast and not contributing to the formation of the projected image, thereby improving the resolution of the lens unit 1.

Figure 12A:
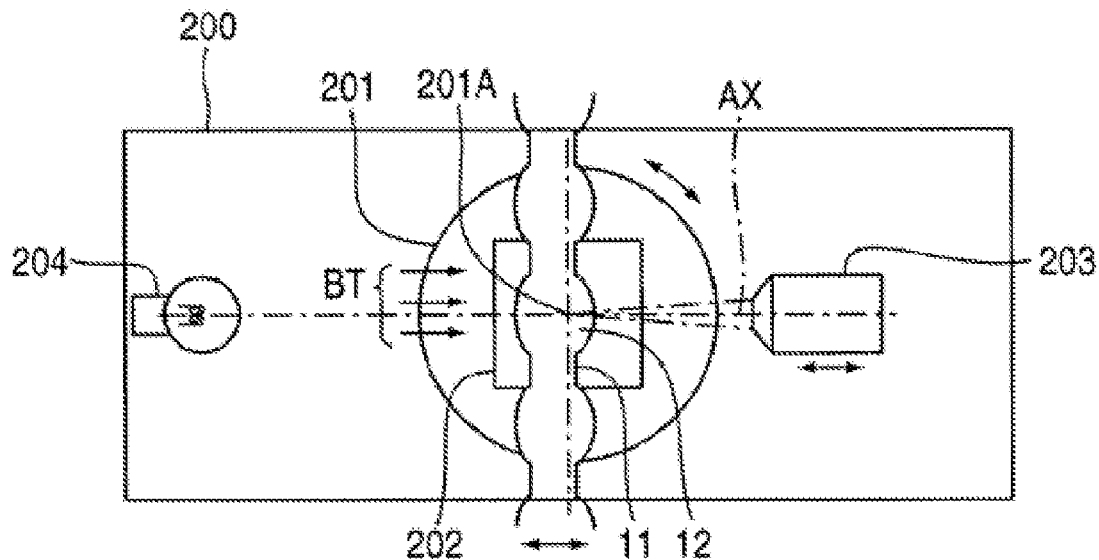
Figure 12B:
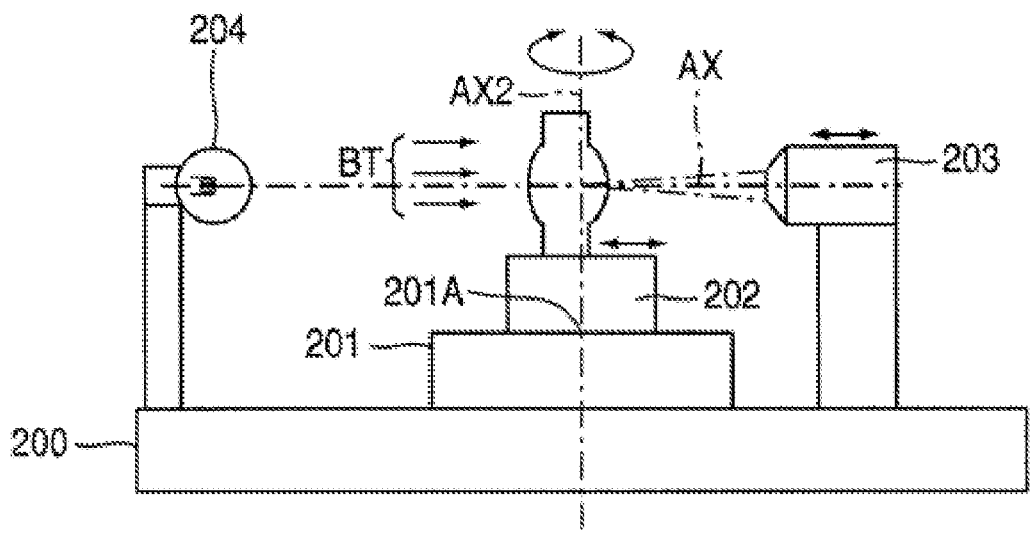

A focal length measurement device 200 will be explained next with reference to FIGS. 12(a) and 12(b). FIGS. 12(a) and 12(b) are schematic views showing the focal length measurement device 200. More specifically, FIG. 12(a) is a schematic plan view of the focal length measurement device 200 and FIG. 12(b) is a schematic side view thereof.

As shown in FIGS. 12(a) and 12(b), the focal length measurement device 200 includes a rotational stage 201, a stage 202, a microscope 203, and a lighting device 204. The rotational stage 201 is configured to rotate the stage 202 and a subject lens 12 (the micro lens 12) disposed on the rotational stage 201 around a rotational axis 201A. The subject lens 12 is fixed on the stage 202, so that the optical axis AX of the subject lens 12 is aligned with an optical axis of the microscope 203. The stage 202 is configured to move in a direction in parallel to the optical axis AX.

In the focal length measurement device 200, the microscope 203 is configured to move in a direction in parallel to the optical axis AX. Further, the microscope 203 is configured to measure a movement amount of the microscope 203 according to a case that a position of a projected image of the microscope 203 is situated at a position of the rotational axis 201A as a standard. The lighting device 204 irradiates parallel light rays BT on the subject lens 12.

A method of measuring the focal length will be explained with reference to FIGS. 12(a) and 12(b). First, the lighting device 204 irradiates the parallel light rays BT on the subject lens 12. While the microscope 203 is confirming that the subject lens 12 forms an image of the parallel light rays BT, the microscope 203 moves away from the subject lens 12. When a size of the image of the parallel light rays BT becomes minimum, the stage 202 and the microscope 203 move separately. Accordingly, it is possible to detect a position of the stage 202 and a position of the microscope 203 where a position of the image of the parallel light rays BT does not change even if the rotational stage 201 slightly rotates.

In the next step, when the position of the image of the parallel light rays BT does not change even if the rotational stage 201 slightly rotates, a movement amount Z1 of the microscope 203 from a position of the rotational axis 201A is measured. The movement amount Z1 corresponds to a focal length F of the subject lens 12. Further, the position of the rotational axis 201A corresponds to a first principal plane of the subject lens 12.

In the next step, while the stage 202 is fixed at a specific position, only the microscope 203 moves toward the subject lens 12, so that an image position of the microscope 203 becomes a surface top position of the subject lens 12. Then, a movement amount Z2 of the microscope 203 from a position of the rotational axis 201A is measured when the image position of the microscope 203 becomes the surface top position of the subject lens 12.

Lastly, a distance LO from the surface top position of the subject lens 12 to an object plane is measured with a different method. Accordingly, a distance SO between the principal plane of the subject lens 12 and the object plane is determined from the following equation:

$$SO = Z2 + LO$$

As described above, the focal length is measured with a well-known measurement method, i.e., a nodal slide method.

An experiment for measuring MTF (Modulation Transfer Function) of the LED head 3 with the lens array 10 will be explained next. In the experiment, the LED head 3 with the lens array 10 showed the MTF greater than 80%. The MTF indicates a resolution of a projected image, a resolution of an exposure device, or a contrast of a projected image of the LED element 30 emitting light in the exposure device. When the MTF is 100%, the contrast of the projected image is at a maximum level, thereby indicating a high resolution of the exposure device. When the MTF decreases, the contrast of the projected image decreases, thereby indicating a lower resolution of the exposure device.

In the experiment, the MTF is defined as follows:

$$MTF(\%) = (EMAX - EMIN)/(EMAX + EMIN) \times 100$$

where EMAX is a maximum value of a light amount of a projected image, and EMIN is a minimum value of a light amount between two projected images situated next to each other.

In the experiment for measuring the MTF, a microscope digital camera captured an image on the image plane IP of the lens unit 1 of the LED head 3 at a position away from a top of the second micro lens 12b on the image plane side by a distance L1 (mm). A distribution of the light amount of the projected image of the LED element 30 was analyzed in the captured image, thereby calculating the MTF. In the experiment, the LED head 3 with the LED elements 30 arranged at an arrangement interval PD of 0.0423 mm was used.

In the embodiment, the value of the MTF is correlated to image quality of the printer 100 as follows. In general, when an image forming apparatus forms an image, it is necessary to have a sufficiently high potential in a static latent image in a portion where toner is not attached. Further, it is necessary for an LED head to form a sufficiently dark image. When the MTF has a small value, the LED head may irradiate light on a portion of a projected image necessary to become a dark portion.

When the LED head irradiates light on a portion of the static latent image, a potential of the portion, where needs to have a high potential, decreases. Accordingly, when the image forming apparatus forms an image, toner may be attached to the portion, where toner is not supposed to attach. When toner is not attached to a portion of an image formed with an image forming apparatus, the portion is supposed to be a white portion, i.e., a color of a sheet. When toner is attached to the portion to become the white portion, however, the portion is smeared with color of toner, thereby deteriorating image quality of the image forming apparatus.

In the embodiment, it is found that when the MTF is greater than 80%, it is possible to form a high quality image without a streak or a density variance.

Figure 13:
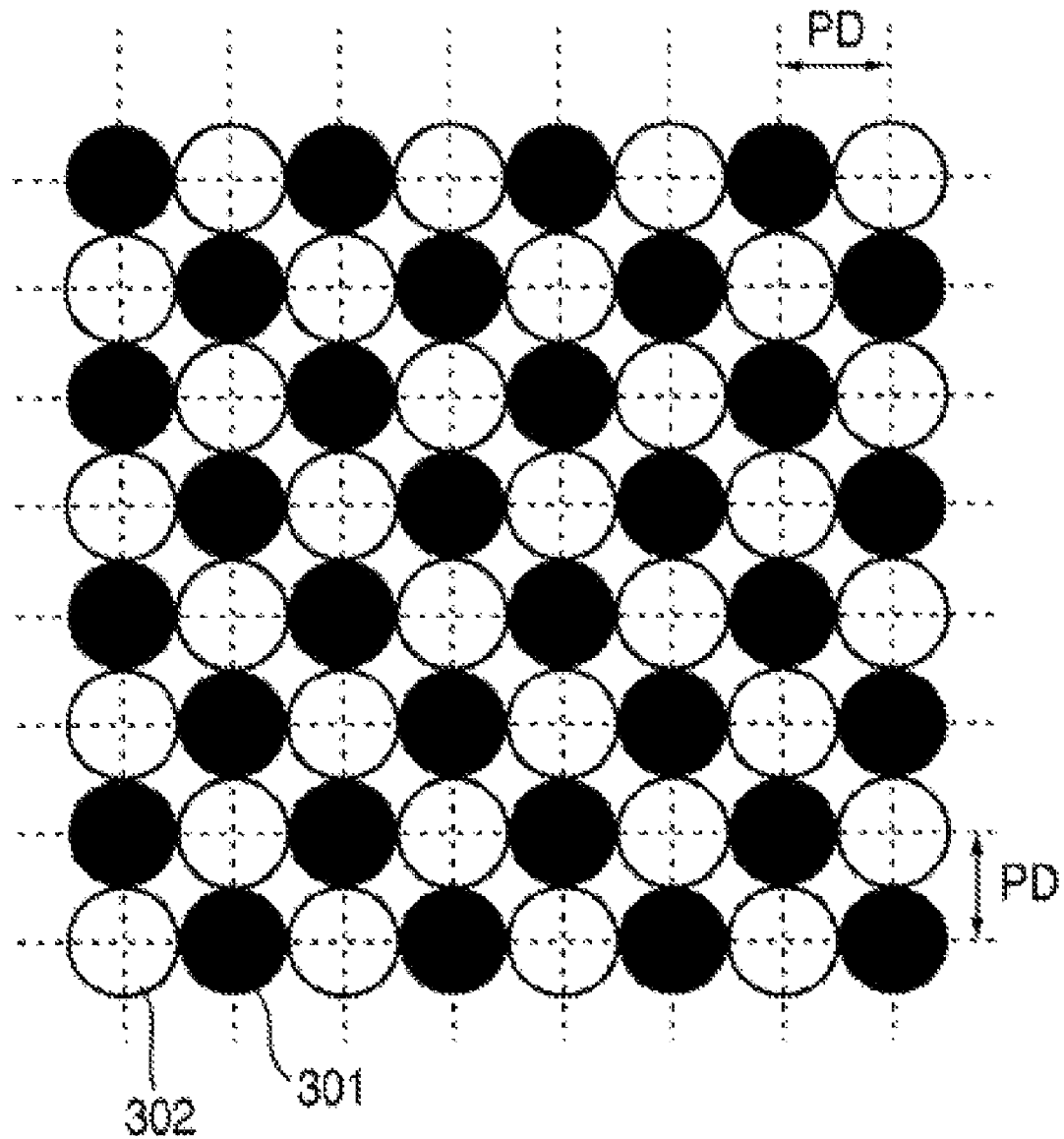
FIG. 13 is a schematic view showing an image used for evaluating the lens unit of the printer according to the first embodiment of the present invention.

An experiment was conducted for evaluating an image of the printer 100 provided with the lens unit 1 using a color LED printer. FIG. 13 is a schematic view showing an image used for evaluating the lens unit 1 of the printer 100 according to the first embodiment of the present invention. The image contained alternate dots among all dots. More specifically, toner was attached to dots 301, and toner was not attached to dots 302. In the embodiment, it was possible to form a high quality image without a streak or a density variance.

As described above, in the embodiment, each of the micro lenses 12 has the rotationally symmetrical high order aspheric surface, and may have a curved surface such as a spherical surface, an anamorphic aspheric surface, a parabolic surface, an oval surface, a hyperbolic surface, a Korenich surface, and the like.

In the embodiment, the lens array 10 is molded through the injection molding, and may be formed through other molding method such as a compression injection molding. Further, the lens array 10 is formed of a resin, and may be formed of glass.

Further, in the embodiment, the light blocking plate 20 is formed of polycarbonate through the injection molding, and may be formed through machining or etching a metal plate. Further, the LED array is formed of a plurality of the LED elements 30 as the light emitting portions, and may be formed of organic EL as light emitting portions or semiconductor lasers. Further, the exposure device may includes a shutter formed of a liquid crystal element provided in a light emitting portion formed of a fluorescent lamp, a halogen lamp, and the like.

As described above, in the embodiment, the aperture 26a on the object plane side is arranged between the object plane OP and the first micro lens 12a. Further, the aperture 26a on the object plane side is configured to have the opening on the object plane side smaller than the opening on the side of the first micro lens 12a. With the configuration, it is possible to effectively block the light ray passing through outside the peripheral light ray BM1 and the light ray incident on a position closer to the optical axis AX relative to the chief ray BC2 between the object plane OP and the first micro lens 12a.

Further, in the embodiment, the aperture 26b on the image plane side is arranged between the image plane OP and the second micro lens 12b. Further, the aperture 26b on the image plane side is configured to have the opening on the image plane side smaller than the opening on the side of the second micro lens 12b. With the configuration, it is possible to effectively block the light ray passing through outside the peripheral light ray BM1 and the light ray incident on a position closer to the optical axis AX relative to the chief ray BC2 between the image plane OP and the second micro lens 12b.

As described above, alternatively in the embodiment, the aperture 26a on the object plane side is arranged between the object plane OP and the first micro lens 12a. Further, the aperture 26a on the object plane side is configured to have the opening on the object plane side larger than the opening on the side of the first micro lens 12a. With the configuration, it is possible to effectively block the light ray passing through outside the peripheral light ray BM and a position closer to the centerline CL between the object plane OP and the first micro lens 12a.

Further, in the embodiment, the aperture 26b on the image plane side is arranged between the image plane OP and the second micro lens 12b. Further, the aperture 26b on the image plane side is configured to have the opening on the image plane side larger than the opening on the side of the second micro lens 12b. With the configuration, it is possible to effectively block the light ray passing through outside the peripheral light ray BM1 and a position closer to the centerline CL between the image plane OP and the second micro lens 12b.

In the embodiment, it is possible to prevent the light ray passing from one of the two micro lenses arranged next to each other to the other of the two micro lenses from reaching the image plane. Accordingly, it is possible to improve the resolution of the optical system without lowering the contrast of the projected image of the object. As a result, it is possible to improve the contrast of the projected image of the exposure device, and to provide the printer 100 as the image forming apparatus capable of forming a clear image.

Second Embodiment

A second embodiment of the present invention will be explained next. In the first embodiment, the lens unit 1 is applied to the printer 100 as the image forming apparatus. In the second embodiment, the lens unit 1 is applied to a reading apparatus 500. Components in the second embodiment similar to those in the first embodiment are designated with the same reference numerals, and explanations thereof are omitted.

Figure 14:
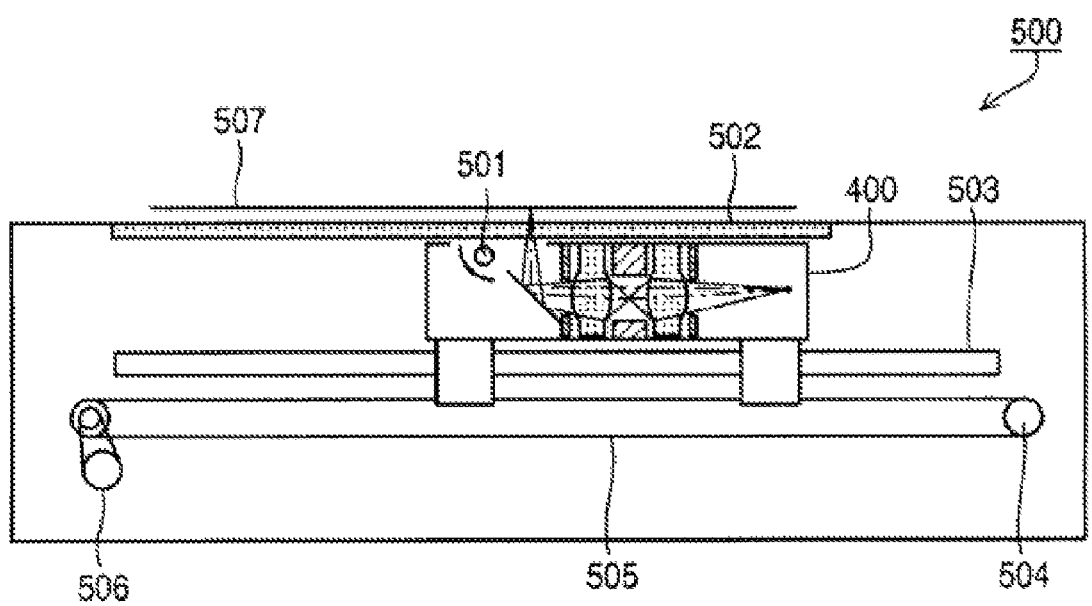
FIG. 14 is a schematic plan view showing a configuration of a reading apparatus according to a second embodiment of the present invention.

FIG. 14 is a schematic plan view showing a configuration of the reading apparatus 500 according to a second embodiment of the present invention. In the embodiment, the reading apparatus 500 is a scanner for reading an original and creating electric data as image data.

As shown in FIG. 14, the reading apparatus 500 includes a reading head 400, a lamp 501, an original table 502, a rail 503, a drive belt 505, a motor 506, and the like. In the embodiment, the lamp 501 as a lighting device irradiates an original 507. The reading head 400 receives light reflected on a surface of the original 507, and converts light to electric data. The lamp 501 is arranged so that light reflected on the surface of the original 507 is incident on the reading head 400.

In the embodiment, the original table 502 is provided for placing the original 507 for creating the electric data. The original table 502 is formed of a material transparent relative to visible light. The rail 503 is disposed below the original table 502 for moving the reading head 400. The reading head 400 is attached to the drive belt 505 extended with a pulley 504, so that the reading head 400 moves on the rail 503 when the motor 506 drives the drive belt 505.

Figure 15:
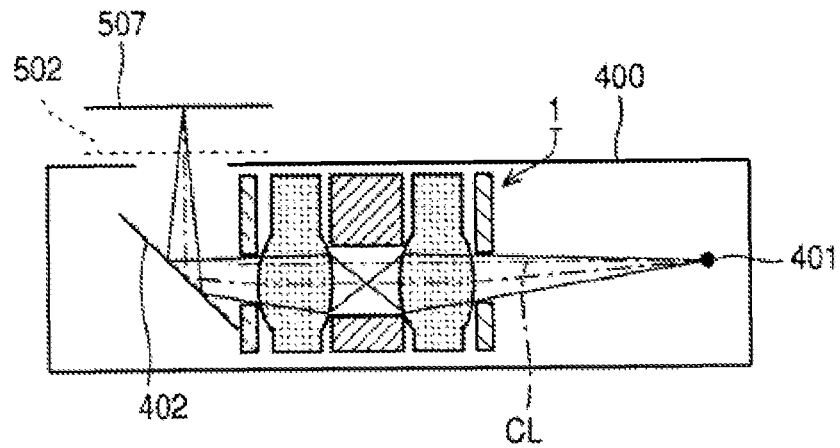
FIG. 15 is a schematic sectional views showing a configuration of a reading head of the reading apparatus according to the second embodiment of the present invention.

A configuration of the reading head 400 will be explained next with reference to FIG. 15. FIG. 15 is a schematic sectional views showing a configuration of the reading head 400 of the reading apparatus 500 according to the second embodiment of the present invention.

As shown in FIG. 15, the reading head 400 includes the lens unit 1, a line sensor 401 and a mirror 402. The mirror 402 is provided for bending an optical path of light reflected from the original 507, so that a light ray is incident on the lens unit 1. The line sensor 401 includes a plurality of light receiving elements arranged in a substantially linear arrangement for converting a projected image of the original 507 formed with the lens unit 1 to an electric signal. The line sensor 401 is arranged on the centerline CL of the lens unit 1 at the center in the width direction thereof.

Figure 16:
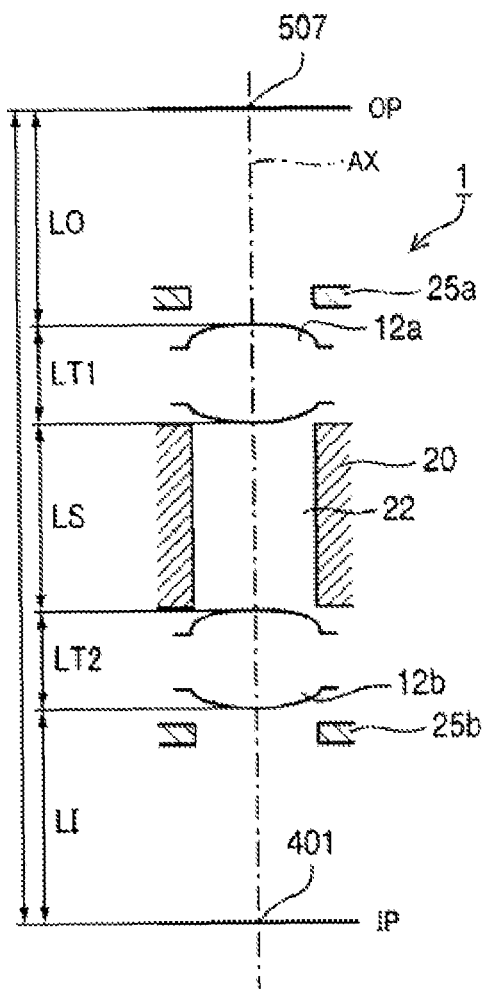
FIG. 16 is a schematic view showing the reading head of the reading apparatus according to the second embodiment of the present invention.

FIG. 16 is a schematic view showing the reading head 400 of the reading apparatus 500 according to the second embodiment of the present invention. FIG. 16 shows a detailed configuration of the reading head 400, and a positional relationship between the object plane OP (the original 507) and the image plane IP. In the second embodiment, the lens unit 1 has a configuration similar to that in the first embodiment.

In the embodiment, the line sensor 401 has a resolution of 600 dpi, that is, 600 of the light receiving elements are arranged per one inch with an interval of 0.0423 mm.

An operation of the reaming apparatus 500 will be explained with reference to FIG. 14. When the lamp 501 is turned on and irradiates the original 507, the reading head 400 receives light reflected at the surface of the original 507. When the motor 506 drives the drive belt 505, the reading head 400 and the lamp 501 move laterally in FIG. 14, so that the reading head 400 receives light reflected from an entire surface of the original 507.

An operation of the reading head 400 will be explained next with reference to FIG. 15. As shown in FIG. 15, light reflected at the surface of the original 507 passes through the original table 502, and the mirror 402 bends the optical path of light, so that the lens unit 1 receives light. Accordingly, the lens unit 1 forms the projected image of the original 507 on the line sensor 401, so that the line sensor 401 converts the projected image of the original 507 to the electrical signal, thereby creating electrical data.

An evaluation of the reaming apparatus 500 with the lens unit 1 was conducted. In the evaluation, it was possible to obtain image data with high quality similar to that of the original 507. In the evaluation, the reading apparatus 500 read the image at the resolution of 600 dpi having the pattern shown in FIG. 13, in which the dots are arranged with the interval PD of 0.0423 mm. More specifically, among the dots arranged with the interval PD of 0.0423 mm at the resolution of 600 dpi, the dots are alternately formed over the entire print area of the medium.

In the embodiments described above, the scanner is explained as the reading apparatus for converting the image of the original to the electric data. The reading apparatus may include a sensor or a switch for converting an optical signal to an electrical signal, or an input/output device, a biometric identification device, a communication device, a dimension measurement device and the like using the sensor or the switch.

As described above, in the second embodiment, it is possible to obtain the effect similar to that in the first embodiment. That is, it is possible to obtain the image data similar to the original.

The disclosure of Japanese Patent Application No. 2009-047159, filed on Feb. 27, 2009, is incorporated in the application by reference.

While the invention has been explained with reference to the specific embodiments of the invention, the explanation is illustrative and the invention is limited only by the appended claims.

What is claimed is:

1. A lens unit comprising:
   a lens array including a plurality of lens pairs arranged in a substantially linear arrangement, each of said lens pairs including a first lens for forming an inverted reduced-size image of an object and a second lens for forming an inverted enlarged-size image of the inverted reduced-size image;
   a first light blocking member disposed between the first lenses and the second lenses, said first light blocking member including first apertures; and
   a second light blocking member including second apertures arranged in a substantially linear arrangement corresponding to an arrangement interval of the lens pairs, said second apertures having different opening portion shapes depending on a position of the lens pairs in an optical axis direction of the lens pairs,
   wherein said second light blocking member is disposed between the first lenses and the object plane at a position away from the object plane by a distance greater than a threshold value PO, said second apertures having an opening portion on a side of the object plane smaller than an opening portion on a side of the first lenses, and
   wherein said first lenses have a radius RY1 in the arrangement direction; said first lenses have a focal length F1; said first lenses have a first principal plane situated away from the object plane by distance SO; and said first apertures have an opening radius RAY in the arrangement direction so that the following equation is satisfied:

$$PO = \frac{SO - F1}{RY1 \cdot F1 + SO \cdot RAY} RAY \cdot SO.$$

2. The lens unit according to claim 1, wherein said lens pairs are arranged in an arrangement direction with an arrangement interval PY; said first lenses have a radius RY1 in the arrangement direction; said first lenses have a first main plane situated away from the object plane by a distance SO; and said second apertures have an opening radius ROY in the arrangement direction at a position in the second apertures away from the object plane by a distance MO in the optical axis direction so that the following equation is satisfied:

$$\frac{RY1}{SO} MO < ROY < \frac{PY}{2}.$$

3. The lens unit according to claim 1, wherein said lens pairs are arranged in two rows in an arrangement direction; said first lenses have a radius RX1 in a specific direction perpendicular to the arrangement direction and the optical axis from the optical axis toward a centerline of the lens unit in a width direction; each of said first apertures has an inner wall away from the optical axis by a distance RAX in the specific direction; said lens pairs are arranged with an arrangement interval PX in the specific direction; said first lenses have a first main plane situated away from the object plane by a distance SO; and each of said second apertures has an inner wall away from the optical axis by a distance ROX at a position in the second apertures away from the object plane by a distance MO in the optical axis direction so that the following equation is satisfied:

$$\left(\frac{PX}{2} - RAX\right)\frac{MO}{SO} < ROX < RX1.$$

4. An LED (Light Emitting Diode) head comprising the lens unit according to claim 1.

5. An exposure device comprising the lens unit according to claim 1.

6. An image forming apparatus comprising the lens unit according to claim 1.

7. An image reading apparatus comprising the lens unit according to claim 1.

8. A lens unit comprising:
a lens array including a plurality of lens pairs arranged in a substantially linear arrangement, each of said lens pairs including a first lens for forming an inverted reduced-size image of an object and a second lens for forming an inverted enlarged-size image of the inverted reduced-size image;
a first light blocking member disposed between the first lenses and the second lenses, said first light blocking member including first apertures; and
a second light blocking member including second apertures arranged in a substantially linear arrangement corresponding to an arrangement interval of the lens pairs, said second apertures having different opening portion shapes depending on a position of the lens pairs in an optical axis direction of the lens pairs,
wherein said second light blocking member is disposed between the first lenses and the object plane at a position away from the object plane by a distance smaller than a threshold value PO, said second apertures having an opening portion on a side of the object plane greater than an opening portion on a side of the first lenses, and
wherein said first lenses have a radius RY1 in the arrangement direction; said first lenses have a focal length F1; said first lenses have a first principal plane situated away from the object plane by a distance SO; and said first apertures have an opening radius RAY in the arrangement direction so that the following equation is satisfied:

$$PO = \frac{SO - F1}{RY1 \cdot F1 + SO \cdot RAY} RAY \cdot SO.$$

9. The lens unit according to claim 8, wherein said lens pairs are arranged in an arrangement direction with an arrangement interval PY; said first lenses have a focal length F1; said first lenses have a first main plane situated away from the object plane by a distance SO; said first apertures have an opening radius RAY in the arrangement direction; and said second apertures have an opening radius ROY in the arrangement direction at a position in the second apertures away from the object plane by a distance MO in the optical axis direction so that the following equation is satisfied:

$$\frac{RAY}{F1}(SO - F1 - MO) < ROY < \frac{PY}{2}.$$

10. An LED (Light Emitting Diode) head comprising the lens unit according to claim 8.

11. An exposure device comprising the lens unit according to claim 8.

12. An image forming apparatus comprising the lens unit according to claim 8.

13. An image reading apparatus comprising the lens unit according to claim 8.

14. A lens unit comprising:
a lens array including a plurality of lens pairs arranged in a substantially linear arrangement, each of said lens pairs including a first lens for forming an inverted reduced-size image of an object and a second lens for forming an inverted enlarged-size image of the inverted reduced-size image;
a first light blocking member disposed between the first lenses and the second lenses, said first light blocking member including first apertures; and
a second light blocking member including second apertures arranged in a substantially linear arrangement corresponding to an arrangement interval of the lens pairs, said second apertures having different opening portion shapes depending on a position of the lens pairs in an optical axis direction of the lens pairs,
wherein said second light blocking member is disposed between the second lenses and the image plane at a position away from the image plane by a distance smaller than a threshold value PI, said second apertures having an opening portion on a side of the image plane greater than an opening portion on a side of the second lenses, and
wherein said second lenses have a radius RY2 in the arrangement direction; said second lenses have a focal length F2; said second lenses have a first principal plane situated away from the object plane by a distance SI; and said first apertures have an opening radius RAY in the arrangement direction so that the following equation is satisfied:

$$PI = \frac{SI - F2}{RY2 \cdot F2 + S1 \cdot RAY} RAY \cdot SI.$$

15. The lens unit according to claim 14, wherein said lens pairs are arranged in an arrangement direction with an arrangement interval PY; said second lenses have a focal length F2; said second lenses have a second main plane situated away from the image plane by a distance SI; said first apertures have an opening radius RAY in the arrangement direction; and said second apertures have an opening radius RIY in the arrangement direction at a position in the second apertures away from the image plane by a distance MI in the optical axis direction so that the following equation is satisfied:

$$\frac{RAY}{F2}(SI - F2 - MI) < RIY < \frac{PY}{2}.$$

16. The lens unit according to claim 14, wherein said lens pairs are arranged in two rows in an arrangement direction; said second lenses have a radius RX2 in a specific direction perpendicular to the arrangement direction and the optical axis from the optical axis toward a centerline of the lens unit in a width direction; each of said first apertures has an inner wall away from the optical axis by a distance RAX in the specific direction; said lens pairs are arranged with an arrangement interval PX in the specific direction; said second lenses have a second main plane situated away from the image plane by a distance SI; and each of said second apertures has an inner wall away from the optical axis by a distance RIX at a position in the second apertures away from the image plane by a distance MI in the optical axis direction so that the following equation is satisfied:

$$\left(\frac{PX}{2} - RAX\right)\frac{MI}{SI} < RIX < RX2.$$

17. An LED (Light Emitting Diode) head comprising the lens unit according to claim 14.

18. An exposure device comprising the lens unit according to claim 14.

19. An image forming apparatus comprising the lens unit according to claim 14.

20. An image reading apparatus comprising the lens unit according to claim 14.

* * * * *